(12) United States Patent
Nakagawa

(10) Patent No.: US 11,859,679 B2
(45) Date of Patent: Jan. 2, 2024

(54) CONTROL DEVICE

(71) Applicant: DENSO CORPORATION, Kariya (JP)

(72) Inventor: Masashi Nakagawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/182,126

(22) Filed: Mar. 10, 2023

(65) Prior Publication Data

US 2023/0213073 A1  Jul. 6, 2023

Related U.S. Application Data

(63) Continuation of application No. PCT/JP2021/033719, filed on Sep. 14, 2021.

(30) Foreign Application Priority Data

Sep. 15, 2020  (JP) ................ 2020-154959

(51) Int. Cl.
*F16D 48/06* (2006.01)
*F16D 13/52* (2006.01)

(52) U.S. Cl.
CPC .......... *F16D 48/064* (2013.01); *F16D 48/06* (2013.01); *F16D 13/52* (2013.01); *F16D 2500/1023* (2013.01); *F16D 2500/1045* (2013.01); *F16D 2500/10412* (2013.01); *F16D 2500/1107* (2013.01); *F16D 2500/3021* (2013.01); *F16D 2500/3022* (2013.01); *F16D 2500/3166* (2013.01); *F16D 2500/50287* (2013.01); *F16D 2500/7044* (2013.01); *F16D 2500/70626* (2013.01)

(58) Field of Classification Search
None
See application file for complete search history.

(56) References Cited

U.S. PATENT DOCUMENTS

| 6,607,253 | B1* | 8/2003 | Yamamoto | B60T 7/042 |
| | | | | 303/155 |
| 2013/0169196 | A1* | 7/2013 | Markham | H02P 6/08 |
| | | | | 318/3 |
| 2016/0069402 | A1* | 3/2016 | Chimner | F16D 48/066 |
| | | | | 701/67 |
| 2018/0119757 | A1* | 5/2018 | Kinch | F16H 61/061 |

FOREIGN PATENT DOCUMENTS

JP  2016-23668  2/2016

* cited by examiner

*Primary Examiner* — Timothy Hannon
(74) *Attorney, Agent, or Firm* — Nixon & Vanderhye P.C.

(57) ABSTRACT

A control device controls a torque transmission device. The torque transmission device includes an actuator that operates by being energized and a torque transmission portion that is switched to a transmission state or a non-transmission state by the actuator operating, and transmits a torque between a first transmission portion and a second transmission portion when the torque transmission portion is in the transmission state. The control device includes a target calculation unit, a mode determination unit, and a control unit. The target calculation unit calculates a target transmission torque that is a torque to be transmitted between the first transmission portion and the second transmission portion. The mode determination unit determines an operating mode among an engagement mode, a release mode, and a steady mode. The control unit controls the actuator based on the operating mode determined by the mode determination unit.

17 Claims, 15 Drawing Sheets

CONTROL DEVICE

CROSS REFERENCE TO RELATED APPLICATIONS

The present application is a continuation application of International Patent Application No. PCT/JP2021/033719 filed on Sep. 14, 2021, which designated the U.S. and claims the benefit of priority from Japanese Patent Application No. 2020-154959 filed on Sep. 15, 2020. The entire disclosures of all of the above applications are incorporated herein by reference.

TECHNICAL FIELD

The present disclosure relates to a control device.

BACKGROUND

There is known a torque transmission device including an actuator that operates by being energized and a torque transmission portion that is switched to a transmission state or a non-transmission state by the operation of the actuator. The torque transmission device transmits a torque between a first transmission portion and a second transmission portion when the torque transmission portion is in the transmission state. There is also known a control device that controls the torque transmission device.

SUMMARY

The present disclosure provides a control device that controls a torque transmission device. The torque transmission device includes an actuator that operates by being energized and a torque transmission portion that is switched to a transmission state or a non-transmission state by the actuator operating, and transmits a torque between a first transmission portion and a second transmission portion when the torque transmission portion is in the transmission state. The control device includes a target calculation unit, a mode determination unit, and a control unit. The target calculation unit calculates a target transmission torque that is a torque to be transmitted between the first transmission portion and the second transmission portion. The mode determination unit determines an operating mode among an engagement mode, a release mode, and a steady mode. The control unit controls the actuator based on the operating mode determined by the mode determination unit.

BRIEF DESCRIPTION OF DRAWINGS

The features and advantages of the present disclosure will become more apparent from the following detailed description made with reference to the accompanying drawings. In the drawings.

DETAILED DESCRIPTION

Figure 1:
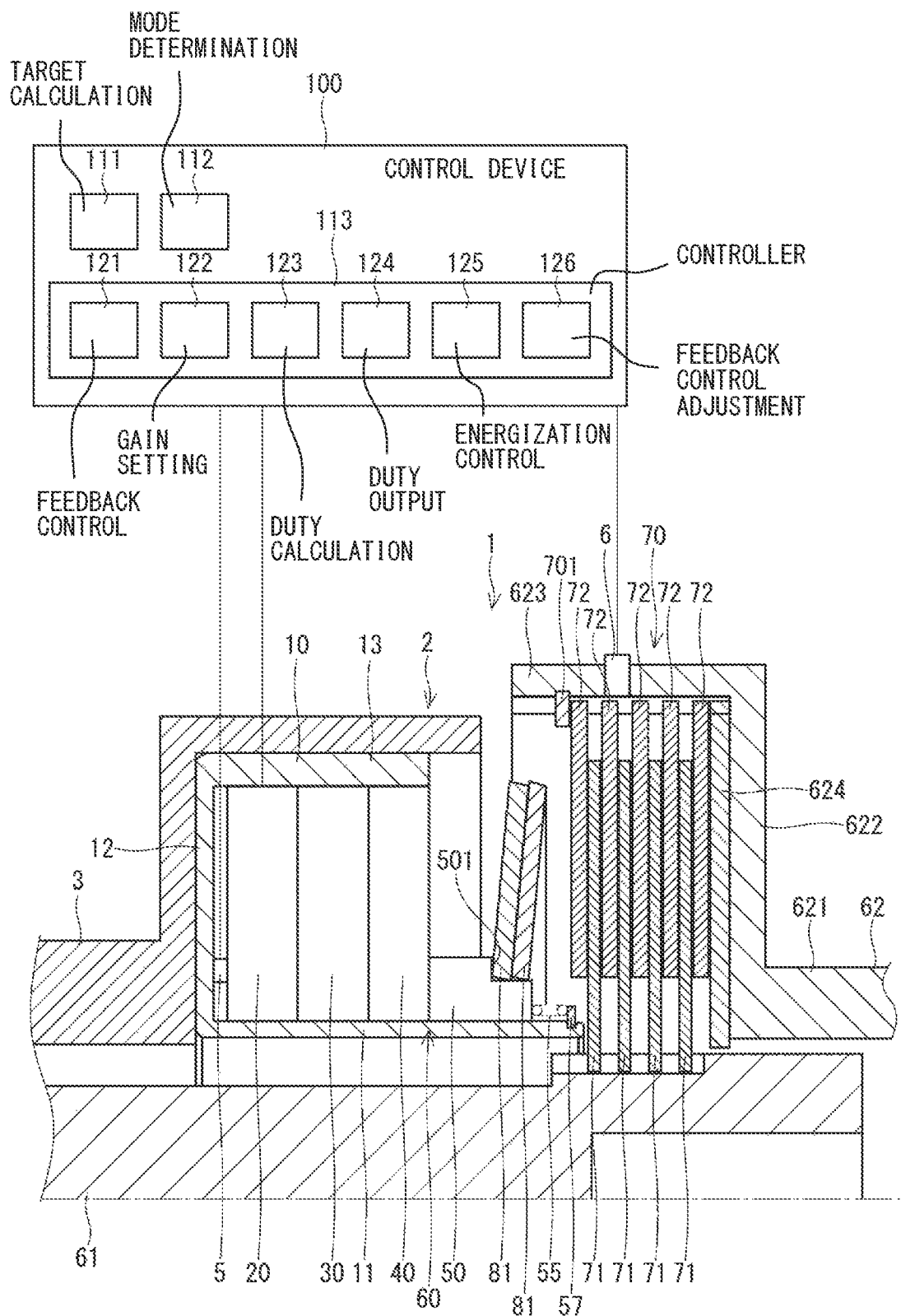
FIG. 1 is a schematic diagram illustrating a torque transmission device and a control device according to a first embodiment.

For example, in a control device for an exemplary torque transmission device, when a piston stroke amount of an actuator operated by energization reaches an indicated value, drive of the actuator and a PID control are stopped, and an integral term in the PID control is initialized. After that, the PID control is restarted when the piston stroke amount exceeds a predetermined threshold value or when a predetermined time has passed since the stop of the PID control. As a result, rapid convergence of overshoot and undershoot is attempted.

However, in the control device, there is a possibility that a difference occurs between an output duty immediately after the control is restarted and an output duty immediately before the stop after convergence when the PID control is stopped and the integral term is initialized, and there is a possibility that variations in the load immediately after the control, that is, a stroke behavior may occur.

For example, in the control device, when the duty of the integral term converges to the target with +10%, the duty immediately after restarting the control is output 10% lower than the original balance point. Further, when the duty of the integral term converges to the target at −10%, the duty immediately after restarting the control is output 10% higher than the original balance point, and the load response immediately after resuming control may deteriorate.

The present disclosure provides a control device that stabilizes behavior of a torque transmission device immediately after feedback control is restarted.

An exemplary embodiment of the present disclosure provides a control device that controls a torque transmission device. The torque transmission device includes an actuator that operates by being energized and a torque transmission portion that is switched to a transmission state or a non-transmission state by the actuator operating, and transmits a torque between a first transmission portion and a second transmission portion when the torque transmission portion is in the transmission state. The control device includes a target calculation unit, a mode determination unit, and a control unit. The target calculation unit calculates a target transmission torque that is a torque to be transmitted between the first transmission portion and the second transmission portion. The mode determination unit determines that an operating mode is an engagement mode when the target transmission torque increases over time, determine that the operating mode is a release mode when the target transmission torque decreases over time, and determine that the operating mode is a steady mode when the target transmission torque does not change over time. The control unit controls the actuator based on the operating mode determined by the mode determination unit. The control unit includes a feedback control unit, a gain setting unit, a duty calculation unit, a duty output unit, an energization control unit, and a feedback control adjustment unit. The feedback control unit performs feedback-control of the actuator based on the target transmission torque. The gain setting unit sets a gain used for the feedback-control by the feedback control unit. The duty calculation unit calculates a duty based on the gain. The duty output unit outputs the duty calculated by the duty calculation unit as an output duty. The energization control unit controls energization of the actuator based on the output duty output from the duty output unit. The feedback control adjustment unit shifts to a control stop mode that causes the feedback control unit to stop the feedback-control of the actuator when a predetermined stop condition is satisfied in a case where the mode determination unit determines that the operating mode is the steady mode. The feedback control adjustment unit stores an integral calculation value in the feedback-control immediately before the feedback control unit stops the feedback-control of the actuator when shifting to the control stop mode, and then restarts the feedback control unit performing the feedback-control of the actuator by using the integral calculation value stored when a predetermined restart condition is satisfied.

In the exemplary embodiment of the present disclosure, it is possible to reduce the difference between the output duty of the torque transmission device immediately before the feedback control is stopped and the output duty immediately after the feedback control is restarted, thereby suppressing variations in the load behavior immediately after the feedback control is restarted. Therefore, the behavior of the torque transmission device immediately after the feedback control is restarted can be stabilized.

Hereinafter, torque transmission devices and control devices according to multiple embodiments will be described with reference to the drawings. Elements that are substantially the same in the embodiments are denoted by the same reference signs and will not be described.

(First Embodiment)

A torque transmission device and a control device according to a first embodiment are illustrated in FIG. 1. A torque transmission device 1 is, for example, a clutch device, is provided between an internal combustion engine and a transmission of a vehicle, and is used to allow or block transmission of a torque between the internal combustion engine and the transmission. A control device 100 is used to control the torque transmission device 1.

The torque transmission device 1 includes an actuator 2 and a clutch 70 serving as a "torque transmission portion". The actuator 2 includes a housing 10, an electric motor 20, a speed reducer 30, a rotational translation unit 60, and a pressing unit 81.

The torque transmission device 1 includes an input shaft 61 as a "first transmission portion" and an output shaft 62 as a "second transmission portion".

The control device 100 is, for example, an electronic control unit, that is, an ECU, and is a small computer including a CPU as a calculation unit, a ROM, a RAM, and the like as storage units, and an I/O and the like as input and output units. Based on information such as signals from various sensors provided in parts of the vehicle, the control device 100 executes a calculation according to a program stored in the ROM or the like and controls operation of various devices and machines of the vehicle. In this way, the control device 100 executes the program stored in a non-transitory tangible storage medium. By executing the program, a method corresponding to the program is executed.

The control device 100 can control operation of the internal combustion engine and the like based on the information such as the signals from various sensors. The control device 100 can control operation of the electric motor 20, which will be described later.

The input shaft 61 is connected to, for example, a drive shaft (not illustrated) of the internal combustion engine, and is rotatable together with the drive shaft. That is, a torque from the drive shaft is input to the input shaft 61.

The vehicle equipped with the internal combustion engine is provided with a fixing flange 3 (see FIG. 1). The fixing flange 3 is formed in a tubular shape, and is fixed to, for example, an engine compartment of the vehicle. The input shaft 61 is supported by the fixing flange 3 via, for example, a bearing.

The housing 10 is provided between an inner peripheral wall of an end portion of the fixing flange 3 and an outer peripheral wall of the input shaft 61. The housing 10 includes a housing inner cylinder portion 11, a housing plate portion 12, a housing outer cylinder portion 13, and the like.

The housing inner cylinder portion 11 is formed in a substantially cylindrical shape. The housing plate portion 12 is formed in an annular plate shape in a manner of extending radially outward from an end portion of the housing inner cylinder portion 11. The housing outer cylinder portion 13 is formed in a substantially cylindrical shape in a manner of extending from an outer edge portion of the housing plate portion 12 to the same side as the housing inner cylinder portion 11. Here, the housing inner cylinder portion 11, the housing plate portion 12, and the housing outer cylinder portion 13 are integrally formed of, for example, metal.

The housing 10 is fixed to the fixing flange 3 such that outer walls of the housing plate portion 12 and the housing outer cylinder portion 13 are in contact with a wall surface of the fixing flange 3 (see FIG. 1). The housing 10 is fixed to the fixing flange 3 by a bolt or the like (not illustrated). Here, the housing 10 is provided coaxially with the fixing flange 3 and the input shaft 61.

The electric motor 20 is provided, for example, among the housing inner cylinder portion 11, the housing plate portion 12, and the housing outer cylinder portion 13. The electric motor 20 includes a stator and a rotor (not illustrated), and can output a torque from the rotor by being energized.

The control device 100 can control the operation of the electric motor 20 by controlling electric power to be supplied to the electric motor 20.

In the present embodiment, the torque transmission device 1 includes a rotation angle sensor 5. The rotation angle sensor 5 is provided, for example, between the electric motor 20 and the housing plate portion 12. The rotation angle sensor 5 detects a rotation angle of the electric motor 20 and outputs a signal corresponding to the rotation angle to the control device 100. Accordingly, the control device 100 can detect the rotation angle, a rotation speed, and the like of the electric motor 20 based on the signal from the rotation angle sensor 5.

The speed reducer 30 is provided, for example, on a side opposite to the housing plate portion 12 with respect to the electric motor 20 between the housing inner cylinder portion 11 and the housing outer cylinder portion 13. A torque of the electric motor 20 is input to the speed reducer 30. The speed reducer 30 outputs the torque of the electric motor 20 at a reduced speed.

The rotational translation unit 60 includes a rotation portion 40 and a translation portion 50. The rotation portion 40 is formed in, for example, an annular shape, and is provided on a side opposite to the electric motor 20 with respect to the speed reducer 30 between the housing inner cylinder portion 11 and the housing outer cylinder portion 13. The torque of the electric motor 20 decelerated by the speed reducer 30 is input to the rotation portion 40. When the torque is received from the speed reducer 30, the rotation portion 40 rotates relative to the housing 10.

The translation portion 50 is formed in, for example, a tubular shape, and is provided on a side opposite to the speed reducer 30 with respect to the rotation portion 40 on a radially outer side of the housing inner cylinder portion 11. When the rotation portion 40 rotates relative to the housing 10, the translation portion 50 moves relative to the housing 10 in an axial direction.

In the present embodiment, the torque transmission device 1 includes a return spring 55 and a C ring 57. The return spring 55 is provided, for example, on a side opposite to the rotation portion 40 with respect to the translation portion 50 on the radially outer side of the housing inner cylinder portion 11. The C ring 57 is provided on, for example, an outer peripheral wall of the housing inner cylinder portion 11 in a manner of being positioned on a side opposite to the translation portion 50 with respect to the return spring 55. One end of the return spring 55 is in contact with the translation portion 50, and the other end is in contact with the C ring 57. The return spring 55 biases the translation portion 50 toward the rotation portion 40.

The output shaft 62 includes a shaft portion 621, a plate portion 622, a cylinder portion 623, and a friction plate 624 (see FIG. 1). The shaft portion 621 is formed in a substantially cylindrical shape. The plate portion 622 is integrally provided with the shaft portion 621 to extend radially outward from one end of the shaft portion 621 in an annular plate shape. The cylinder portion 623 is integrally provided with the plate portion 622 to extend in a substantially cylindrical shape from an outer edge portion of the plate portion 622 toward a side opposite to the shaft portion 621. The friction plate 624 is formed in a substantially annular plate shape, and is provided on an end surface of the plate portion 622 on the side of the cylinder portion 623. The friction plate 624 is not relatively rotatable with respect to the plate portion 622.

An end portion of the input shaft 61 passes through the inside of the housing inner cylinder portion 11 and is positioned on a side opposite to the rotation portion 40 with respect to the translation portion 50. The output shaft 62 is provided coaxially with the input shaft 61 on a side opposite to the fixing flange 3 with respect to the housing 10, that is, on a side opposite to the rotation portion 40 with respect to the translation portion 50. The output shaft 62 is supported by the input shaft 61 via, for example, a bearing. The input shaft 61 and the output shaft 62 are relatively rotatable with respect to the housing 10.

The clutch 70 is provided between the input shaft 61 and the output shaft 62 inside the cylinder portion 623. The clutch 70 includes inner friction plates 71, outer friction plates 72, and a locking portion 701. The multiple inner friction plates 71 are each formed in a substantially annular plate shape, and are aligned in the axial direction between the input shaft 61 and the cylinder portion 623 of the output shaft 62. The inner friction plates 71 are provided such that inner edge portions thereof are spline-coupled to the outer peripheral wall of the input shaft 61. Therefore, the inner friction plates 71 are not relatively rotatable with respect to the input shaft 61 and are capable of relatively moving with respect to the input shaft 61 in the axial direction.

The multiple outer friction plates 72 are each formed in a substantially annular plate shape, and are aligned in the axial direction between the input shaft 61 and the cylinder portion 623 of the output shaft 62. Here, the inner friction plates 71 and the outer friction plates 72 are alternately arranged in the axial direction of the input shaft 61. The outer friction plates 72 are provided such that outer edge portions thereof are spline-coupled to an inner peripheral wall of the cylinder portion 623 of the output shaft 62. Therefore, the outer friction plates 72 are not relatively rotatable with respect to the output shaft 62 and are capable of relatively moving with respect to the output shaft 62 in the axial direction. Among the multiple outer friction plates 72, the outer friction plate 72 positioned closest to the friction plate 624 is capable of coming into contact with the friction plate 624.

The locking portion 701 is formed in a substantially annular shape, and is provided such that an outer edge portion is fitted into the inner peripheral wall of the cylinder portion 623 of the output shaft 62. The locking portion 701 can lock an outer edge portion of the outer friction plate 72 positioned closest to the translation portion 50 among the multiple outer friction plates 72. Therefore, the multiple outer friction plates 72 and the multiple inner friction plates 71 are prevented from coming off from the inside of the cylinder portion 623. A distance between the locking portion 701 and the friction plate 624 is larger than a sum of plate thicknesses of the multiple outer friction plates 72 and the multiple inner friction plates 71.

In an engaged state in which the multiple inner friction plates 71 and the multiple outer friction plates 72 are in contact with each other, that is, are engaged with each other, a frictional force is generated between the inner friction plates 71 and the outer friction plates 72, and relative rotation between the inner friction plates 71 and the outer friction plates 72 is restricted according to a magnitude of the frictional force. On the other hand, in a disengaged state in which the multiple inner friction plates 71 and the multiple outer friction plates 72 are separated from each other, that is, are not engaged with each other, no frictional force is generated between the inner friction plates 71 and the outer friction plates 72, and the relative rotation between the inner friction plates 71 and the outer friction plates 72 is not restricted. Here, the "engaged state" corresponds to a "transmission state", and the "disengaged state" corresponds to a "non-transmission state".

When the clutch 70 is in the engaged state, the torque input to the input shaft 61 is transmitted to the output shaft 62 via the clutch 70. On the other hand, when the clutch 70 is in the disengaged state, the torque input to the input shaft 61 is not transmitted to the output shaft 62.

In this way, the clutch 70 serving as the "torque transmission portion" transmits the torque between the input shaft 61 and the output shaft 62. The clutch 70 allows transmission of the torque between the input shaft 61 and the output shaft 62 in the engaged state in which the clutch 70 is engaged, and cuts off the transmission of the torque between the input shaft 61 and the output shaft 62 in the disengaged state in which the clutch 70 is not engaged.

In the present embodiment, the torque transmission device 1 is a so-called normally open type torque transmission device that is normally in a disengaged state when the electric motor 20 is not energized.

The pressing unit 81 includes two disk springs. The two disk springs are provided such that inner edge portions thereof are positioned in a step portion 501 formed on an outer peripheral wall of an end portion of the translation portion 50 on a clutch 70 side in a state in which the disk springs overlap each other in the axial direction. The pressing unit 81 is elastically deformable in the axial direction.

When the electric motor 20 is not energized, a distance between the rotation portion 40 and the translation portion 50 is relatively small, and a gap is formed between an outer edge portion of the pressing unit 81 and the clutch 70 (see FIG. 1). Therefore, the clutch 70 is in the disengaged state, and the transmission of torque between the input shaft 61 and the output shaft 62 is blocked.

Here, when electric power is supplied to the electric motor 20 under the control of the control device 100, the electric motor 20 rotates, the torque is output from the speed reducer 30, and the rotation portion 40 relatively rotates with respect to the housing 10. Accordingly, the translation portion 50 relatively moves with respect to the housing 10 in the axial direction, that is, moves toward the clutch 70 while compressing the return spring 55. Accordingly, the pressing unit 81 moves toward the clutch 70.

When the pressing unit 81 moves toward the clutch 70 due to the movement of the translation portion 50 in the axial direction, the gap between the pressing unit 81 and the clutch 70 becomes small, and the outer edge portion of the pressing unit 81 comes into contact with the outer friction plate 72 of the clutch 70. When the translation portion 50 further moves in the axial direction after the pressing unit 81 comes into contact with the clutch 70, the pressing unit 81 presses the outer friction plate 72 toward the friction plate 624 while being elastically deformed in the axial direction. Accordingly, the multiple inner friction plates 71 and the multiple outer friction plates 72 are engaged with each other, and the clutch 70 is brought into the engaged state. Therefore, the transmission of the torque between the input shaft 61 and the output shaft 62 is allowed.

When a clutch transmission torque reaches a clutch required torque capacity, the control device 100 stops the rotation of the electric motor 20. Accordingly, the clutch 70 is brought into an engagement maintaining state in which the clutch transmission torque is maintained at the clutch required torque capacity. In this way, by the torque of the electric motor 20, the pressing unit 81 can move in the axial direction and press the clutch 70 to switch the state of the clutch 70 to the engaged state or the disengaged state.

In the output shaft 62, an end portion of the shaft portion 621 opposite to the plate portion 622 is connected to an input shaft of the transmission (not illustrated), and the output shaft 62 is rotatable together with the input shaft. That is, the torque output from the output shaft 62 is input to the input shaft of the transmission. The torque input to the transmission is changed in speed by the transmission, and is output to driving wheels of the vehicle as a drive torque. Accordingly, the vehicle travels.

In the present embodiment, the torque transmission device 1 includes a temperature sensor 6. The temperature sensor 6 is provided on, for example, the cylinder portion 623 of the output shaft 62. The temperature sensor 6 detects temperatures of the clutch 70 and lubricant of the clutch 70, and outputs signals corresponding to the temperatures to the control device 100. Accordingly, the control device 100 can detect the temperatures of the clutch 70 and the lubricant based on the signals from the temperature sensor 6.

As illustrated in FIG. 1, according to the present embodiment, the control device 100 includes the actuator 2 that operates by being energized and the clutch 70 serving as the "torque transmission portion" that is switched to the transmission state or the non-transmission state by the operation of the actuator 2, and controls the torque transmission device 1 that transmits the torque between the input shaft 61 and the output shaft 62 when the clutch 70 is in the transmission state. The control device 100 includes a target calculation unit 111, a mode determination unit 112, and a control unit 113 as conceptual functional units.

Figure 2:
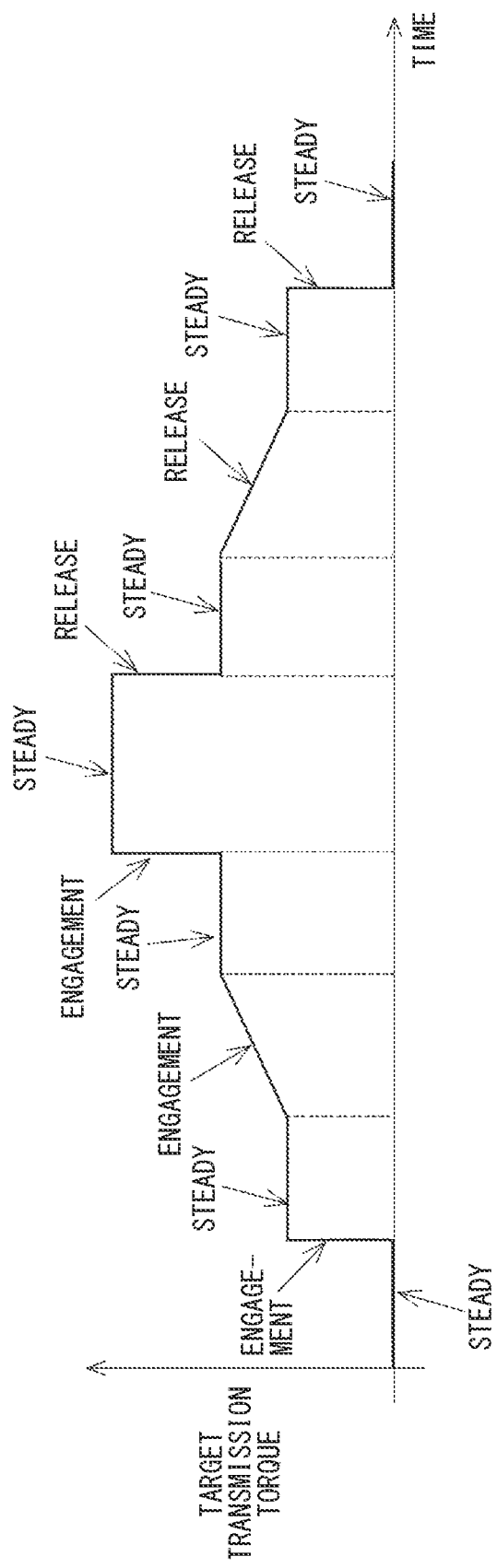
FIG. 2 is a diagram illustrating a target transmission torque that changes over time in the torque transmission device according to the first embodiment.

The target calculation unit 111 calculates a target transmission torque that is a torque to be transmitted between the input shaft 61 and the output shaft 62. The mode determination unit 112 determines that an operating mode is an engagement mode when the target transmission torque increases over time, determines that the operating mode is a release mode when the target transmission torque decreases over time, and determines that the operating mode is a steady mode when the target transmission torque does not change over time (see FIG. 2). The control unit 113 controls the actuator 2 based on the mode determined by the mode determination unit 112.

Here, the "engagement mode" is a mode in which the pressing unit 81 is moved toward the clutch 70 by the actuator 2 to bring the clutch 70 into the engaged state, that is, to engage the clutch 70. The "release mode" is a mode in which the pressing unit 81 is moved to a side opposite to the clutch 70 by the actuator 2 to bring the clutch 70 into the disengaged state, that is, to release the clutch 70. The "steady mode" is a mode in which the pressing unit 81 is held at a predetermined position to maintain the state of the clutch 70 in the engaged state or the disengaged state.

The control unit 113 includes a feedback control unit 121, a gain setting unit 122, a duty calculation unit 123, a duty output unit 124, an energization control unit 125, and a feedback control adjustment unit 126. The feedback control unit 121 feedback-controls the actuator 2 based on the target transmission torque. The gain setting unit 122 sets a gain used for feedback control by the feedback control unit 121.

The duty calculation unit 123 can calculate the duty based on the gain. The duty output unit 124 outputs the output duty calculated by the duty calculation unit 123. The energization control unit 125 controls energization of the actuator 2 based on the output duty output from the duty output unit 124. In the present specification, the term "duty" means a "duty ratio" obtained by dividing a pulse width of a signal by a pulse period (cycle).

Figure 3:
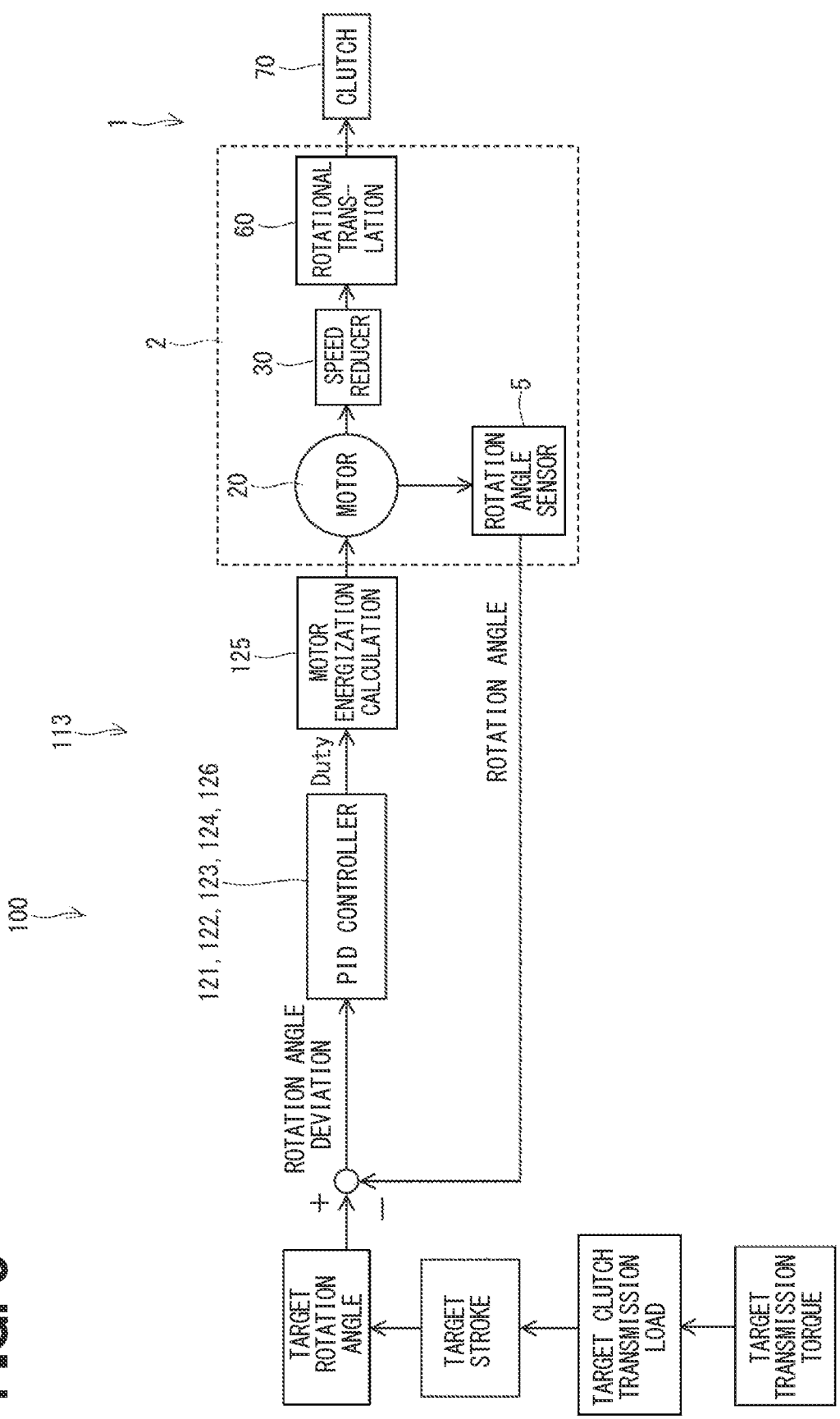
FIG. 3 is a block diagram illustrating the torque transmission device and the control device according to the first embodiment.

As illustrated in FIG. 3, a PID controller includes the feedback control unit 121, the gain setting unit 122, the duty calculation unit 123, the duty output unit 124, and a feedback control adjustment unit 126. In the present embodiment, the feedback control unit 121 PID-controls the electric motor 20 of the actuator 2 based on the target transmission torque and the rotation angle of the electric motor 20 detected by the rotation angle sensor 5. In the present embodiment, a feedback circuit is implemented by software.

Specifically, a target clutch transmission load, which is a load to be transmitted by the clutch 70, is calculated based on the target transmission torque. A target stroke, which is a target movement amount of the pressing unit 81 in the axial direction, is calculated based on the target clutch transmission load. A target rotation angle of the electric motor 20 is calculated based on the target stroke, and a rotation angle deviation which is a deviation between the target rotation angle and the rotation angle of the electric motor 20 detected by the rotation angle sensor 5 is input to the feedback control unit 121.

The duty calculation unit 123 calculates the duty based on the gain set by the gain setting unit 122.

The duty output unit 124 outputs the output duty calculated by the duty calculation unit 123 to the energization control unit 125.

The feedback control adjustment unit 126 shifts to a control stop mode that causes the feedback control unit 121 to stop feedback-controlling the actuator 2 when a predetermined stop condition is satisfied in a case where the mode determination unit 112 determines that the operating mode is the steady mode. Here, the predetermined stop condition may be defined as a case where "a time count starts when a deviation between an actual control value that is an actual control amount of the actuator 2 and a target value becomes within a threshold value, and then it is determined, by the time count, that a predetermined time has passed."

The feedback control adjustment unit 126 stores an integral calculation value in feedback-controlling immediately before the feedback control unit 121 stops feedback-controlling the actuator 2 when shifting to the control stop mode, and then restarts the feedback control unit 121 feedback-controlling the actuator 2 by using the integral calculation value stored when a predetermined restart condition is satisfied. Here, the predetermined restart condition may be defined as a case where "the mode determination unit 112, in the control stop mode, determines that the steady mode shifts to the engagement mode or the release mode."

Figure 4:
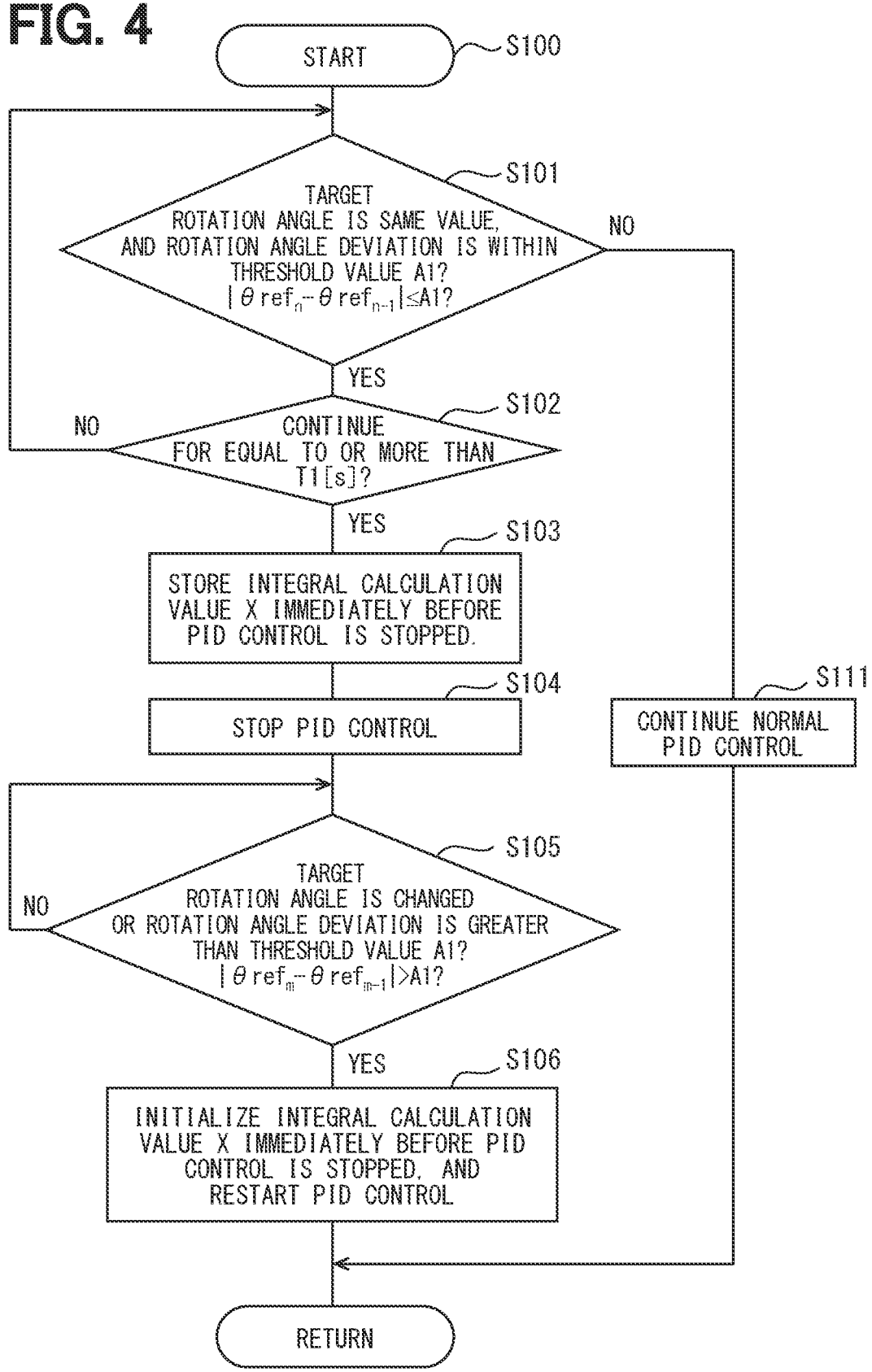
FIG. 4 is a flowchart illustrating processing related to actuator control executed by the control device according to the first embodiment.

A series of pieces of processing related to the control of the actuator 2 by the control device 100 are illustrated in FIG. 4.

S100 of the series of pieces of processing illustrated in FIG. 4 is started when the mode determination unit 112 determines that the mode is the steady mode.

In S101, the feedback control adjustment unit 126 determines whether or not "the target rotation angle is the same value and the rotation angle deviation is within the threshold value A1". Specifically, the feedback control adjustment unit 126 determines whether or not the target rotation angle is the same value as in the previous processing, and the rotation angle deviation, that is, the absolute value of the difference between the rotation angle $\theta ref_n$ of the electric motor 20 and the target rotation angle $\theta ref_{n-1}$ is within the threshold value A1. When the feedback control adjustment unit 126 determines that "the target rotation angle is the same value and the rotation angle deviation is within the threshold value A1" (S101: YES), the processing proceeds to S102. On the other hand, if the feedback control adjustment unit 126 determines that "the target rotation angle is not the same value or the rotation angle deviation is not within the threshold value A1" (S101: NO), the processing proceeds to S111. It should be noted that whether or not "the target rotation angle is the same value and the rotation angle deviation is within the threshold value A1" is the same meaning of a part of the predetermined stop condition, that is, whether or not "the deviation between the actual control amount of the actuator 2 and the target value becomes within a threshold value".

In S102, the feedback control adjustment unit 126 determines whether or not it has continued for a predetermined time T1 (s) or longer. When the feedback control adjustment unit 126 determines that it has continued for the predetermined time T1 or longer (S102: YES), the processing proceeds to S103. On the other hand, when the feedback control adjustment unit 126 determines that it has not continued for the predetermined time T1 or longer (S102: NO), the processing returns to S101.

In S103, the feedback control adjustment unit 126 stores an integral calculation value X at that time, that is, immediately before the PID control stops. After S103, the processing proceeds to S104.

In S104, the feedback control unit 121 stops the feedback control of the actuator 2. After S104, the processing proceeds to S105.

In S105, the feedback control adjustment unit 126 determines whether "the target rotation angle has changed or the rotation angle deviation has become greater than the threshold value A1". Specifically, the feedback control adjustment unit 126 determines whether or not the target rotation angle has changed from the previous processing or the rotation angle deviation, that is, the absolute value of the difference between the rotation angle $\theta ref_n$ of the electric motor 20 and the target rotation angle $\theta ref_{n-1}$ has become greater than the threshold value A1. When the feedback control adjustment unit 126 determines that "the target rotation angle has changed or the rotation angle deviation has become greater than the threshold value A1" (S105: YES), the processing proceeds to S106. On the other hand, when the feedback control adjustment unit 126 determines that "the target rotation angle has not changed and the rotation angle deviation has not become greater than the threshold value A1" (S105: NO), the processing returns to S105. It should be noted that whether or not "the target rotation angle has changed or the rotation angle deviation has become greater than the threshold value A1" is the same meaning of a part of the predetermined stop condition, that is, whether or not "the mode determination unit 112 determines that the steady mode shifts to the engagement mode or the release mode."

In S106, the feedback control unit 121 restarts the feedback control, that is, the PID control of the actuator 2 using the integral calculation value immediately before the PID control is stopped, that is, the integral calculation value stored by the feedback control adjustment unit 126 in S103 as an initial value. After that, the processing exits S100 of the series of pieces of processing.

In S111, the feedback control unit 121 continues the normal PID control of the actuator 2, that is, the feedback control. After that, the processing exits S100 of the series of pieces of processing.

After exiting S100 of the series of pieces of processing, when the mode determination unit 112 determines that the mode is the steady mode, S100 of the series of pieces of processing is restarted.

Figure 5:
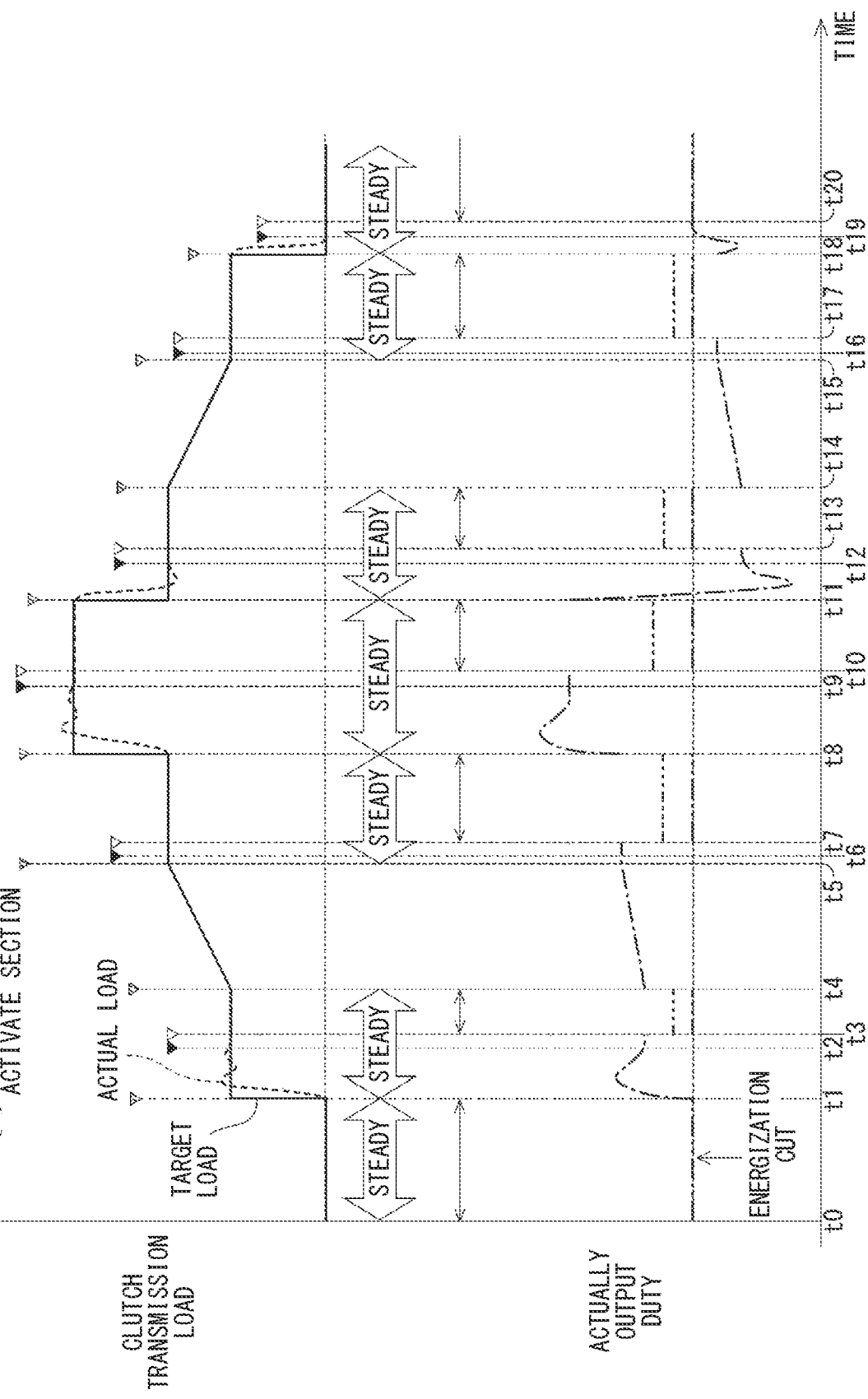
FIG. 5 is a diagram illustrating an operation example of a control device according to the first embodiment.

An operation example of the control device 100 is illustrated in FIG. 5.

When a target clutch transmission load changes to the increasing side at time t1, the mode determination unit 112 determines that the mode is the engagement mode, and the feedback control unit 121 starts the normal PID control of the actuator 2, that is, the feedback control. Therefore, after time t1, the duty calculated based on the gain is output from the duty output unit 124 as the output duty. As a result, the actual load, which is the actual transmission load of the clutch 70, changes so as to approach the target clutch transmission load.

Since the target clutch transmission load does not change after time t1, the mode determination unit 112 determines that the mode is the steady mode. As a result, S100 of the series of pieces of processing described above is started.

At time t2, the rotation angle deviation converges within the threshold value A1, and at time t3 after a predetermined time T1 (s) has elapsed from time t2, the control shifts to the control stop mode. The feedback control adjustment unit 126 stores the integral calculation value X immediately before shifting to the control stop mode, and stops the power supply to the actuator 2, that is, cuts the power supply. As a result, the feedback control of the actuator 2 by the feedback control unit 121 is stopped. In the present embodiment, even when the power supply to the actuator 2 is stopped in the control stop mode, the relative positions of the rotation portion 40 and the translation portion 50 with respect to the housing 10 and the axial relative position, that is, the stroke of the pressing unit 81 with respect to the housing 10 are maintained. Therefore, the state of the clutch 70 is maintained.

When the target clutch transmission load changes to the increasing side at time t4, the mode determination unit 112 determines that the steady mode has shifted to the engagement mode, and the feedback control unit 121 restarts the feedback control of the actuator 2. Here, the feedback control unit 121 restarts the feedback control of the actuator 2 using the integral calculation value X immediately before the PID control is stopped, that is, the integral calculation value X stored at time t3 as an initial value. Therefore, after time t4, the duty calculated based on the gain is output from the duty output unit 124 as the output duty. As a result, the actual load, which is the actual transmission load of the clutch 70, changes so as to follow the target clutch transmission load.

Since the target clutch transmission load does not change after time t5, the mode determination unit 112 determines that the mode is the steady mode. As a result, S100 of the series of pieces of processing described above is started.

At time t6, the rotation angle deviation converges within the threshold value A1, and at time t7 after a predetermined time T1 (s) has elapsed from time t6, the control shifts to the control stop mode. The feedback control adjustment unit 126 stores the integral calculation value X immediately before shifting to the control stop mode, and stops the power supply to the actuator 2. As a result, the feedback control of the actuator 2 by the feedback control unit 121 is stopped.

When the target clutch transmission load changes to the increasing side at time t8, the mode determination unit 112 determines that the steady mode has shifted to the engagement mode, and the feedback control unit 121 restarts the feedback control of the actuator 2. Here, the feedback control unit 121 restarts the feedback control of the actuator 2 using the integral calculation value X immediately before the PID control is stopped, that is, the integral calculation value X stored at time t7 as an initial value. Therefore, after time t8, the duty calculated based on the gain is output from the duty output unit 124 as the output duty. As a result, the actual load, which is the actual transmission load of the clutch 70, changes so as to approach the target clutch transmission load.

Since the target clutch transmission load does not change after time t8, the mode determination unit 112 determines that the mode is the steady mode. As a result, S100 of the series of pieces of processing described above is started.

At time t9, the rotation angle deviation converges within the threshold value A1, and at time t10 after a predetermined time T1 (s) has elapsed from time t9, the control shifts to the control stop mode. The feedback control adjustment unit 126 stores the integral calculation value X immediately before shifting to the control stop mode, and stops the power supply to the actuator 2. As a result, the feedback control of the actuator 2 by the feedback control unit 121 is stopped.

When the target clutch transmission load changes to the decreasing side at time t11, the mode determination unit 112 determines that the steady mode has shifted to the release mode, and the feedback control unit 121 restarts the feedback control of the actuator 2. Here, the feedback control unit 121 restarts the feedback control of the actuator 2 using the integral calculation value X immediately before the PID control is stopped, that is, the integral calculation value X stored at time t10 as an initial value. Therefore, after time t11, the duty calculated based on the gain is output from the duty output unit 124 as the output duty. As a result, the actual load, which is the actual transmission load of the clutch 70, changes so as to approach the target clutch transmission load.

Since the target clutch transmission load does not change after time t11, the mode determination unit 112 determines that the mode is the steady mode. As a result, S100 of the series of pieces of processing described above is started.

At time t12, the rotation angle deviation converges within the threshold value A1, and at time t13 after a predetermined time T1 (s) has elapsed from time t12, the control shifts to the control stop mode. The feedback control adjustment unit 126 stores the integral calculation value X immediately before shifting to the control stop mode, and stops the power supply to the actuator 2. As a result, the feedback control of the actuator 2 by the feedback control unit 121 is stopped.

When the target clutch transmission load changes to the decreasing side at time t14, the mode determination unit 112 determines that the steady mode has shifted to the release mode, and the feedback control unit 121 restarts the feedback control of the actuator 2. Here, the feedback control unit 121 restarts the feedback control of the actuator 2 using the integral calculation value X immediately before the PID control is stopped, that is, the integral calculation value X stored at time t13 as an initial value. Therefore, after time t14, the duty calculated based on the gain is output from the duty output unit 124 as the output duty. As a result, the actual load, which is the actual transmission load of the clutch 70, changes so as to follow the target clutch transmission load.

Since the target clutch transmission load does not change after time t15, the mode determination unit 112 determines that the mode is the steady mode. As a result, S100 of the series of pieces of processing described above is started.

At time t16, the rotation angle deviation converges within the threshold value A1, and at time t17 after a predetermined time T1 (s) has elapsed from time t16, the control shifts to the control stop mode. The feedback control adjustment unit 126 stores the integral calculation value X immediately before shifting to the control stop mode, and stops the power supply to the actuator 2. As a result, the feedback control of the actuator 2 by the feedback control unit 121 is stopped.

When the target clutch transmission load changes to the decreasing side at time t18, the mode determination unit 112 determines that the steady mode has shifted to the release mode, and the feedback control unit 121 restarts the feedback control of the actuator 2. Here, the feedback control unit 121 restarts the feedback control of the actuator 2 using the integral calculation value X immediately before the PID control is stopped, that is, the integral calculation value X stored at time t17 as an initial value. Therefore, after time t18, the duty calculated based on the gain is output from the duty output unit 124 as the output duty. As a result, the actual load, which is the actual transmission load of the clutch 70, changes so as to approach the target clutch transmission load.

Since the target clutch transmission load does not change after time t18, the mode determination unit 112 determines that the mode is the steady mode. As a result, S100 of the series of pieces of processing described above is started.

At time t19, the rotation angle deviation converges within the threshold value A1, and at time t20 after a predetermined time T1 (s) has elapsed from time t19, the control shifts to the control stop mode. The feedback control adjustment unit 126 stores the integral calculation value X immediately before shifting to the control stop mode, and stops the power supply to the actuator 2. As a result, the feedback control of the actuator 2 by the feedback control unit 121 is stopped. Times t1, t4, t5, t8, t11, t14, t15, and t18 are timings at which the target is updated. Further, times t2, t6, t9, t12, t16, and t19 are timings at which the rotation angle deviation converges within the threshold value A1 in the steady state. Further, times t3, t7, t10, t13, t17, and t20 are timings at which a state in which the rotation angle deviation is within the threshold value A1 in the steady state continues for T1 (s), that is, timings for shifting to the control stop mode.

In the control stop mode (time t3 to t4, t7 to t8, t10 to t11, t13 to t14, t17 to t18), the energization control unit 125, without stopping stop the power supply to the actuator 2, may reduce an amount of the power supply to the actuator 2 to maintain a predetermined amount of the power supply (see the three-dot chain line in FIG. 5). In this case, in the control stop mode, the rotation portion 40 and the translation portion 50 with respect to the housing 10 and the axial relative position, that is, the stroke of the pressing unit 81 with respect to the housing 10 can be reliably maintained. Therefore, the state of the clutch 70 can be reliably maintained.

Figure 6:
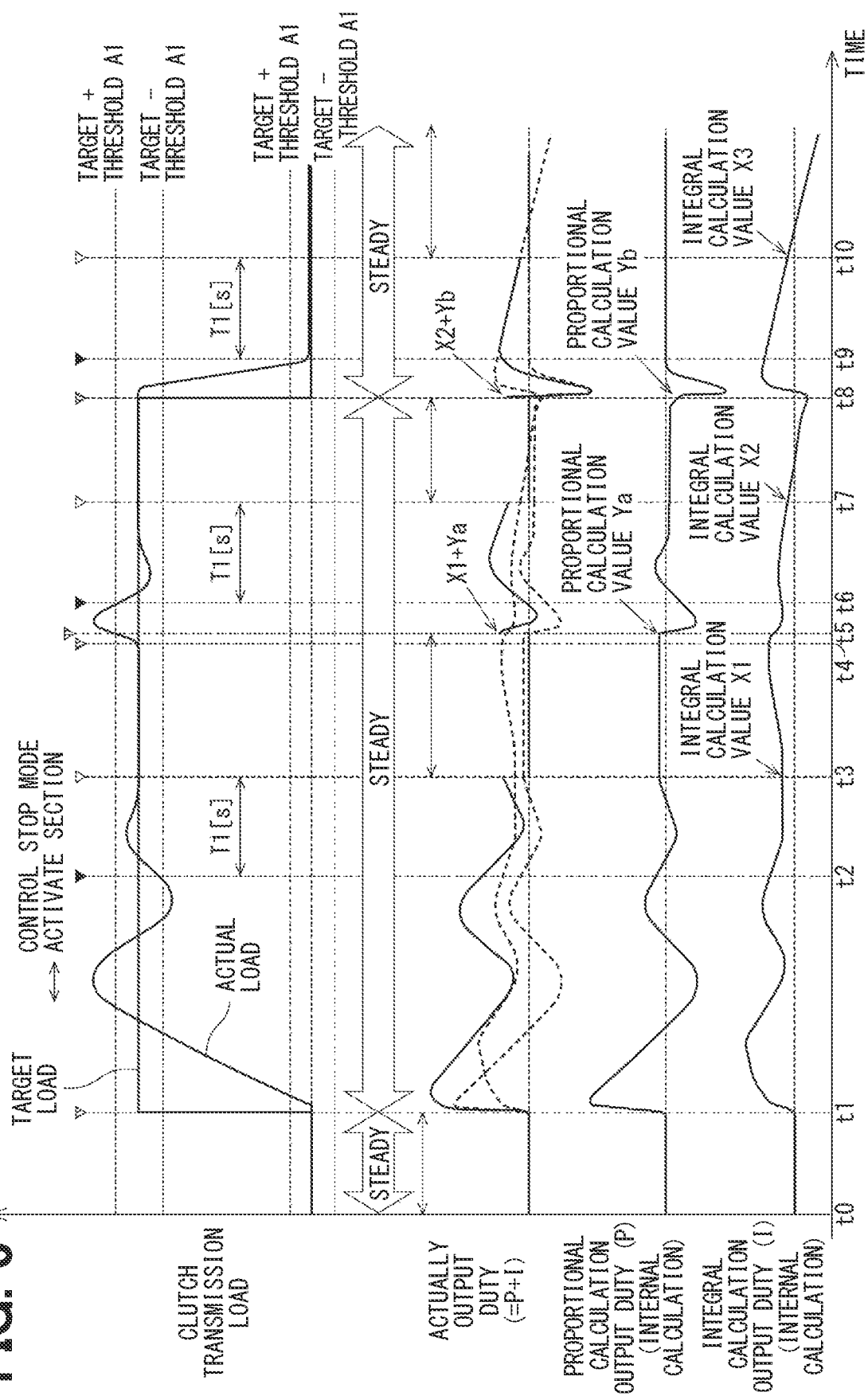
FIG. 6 is a diagram illustrating another operation example of a control device according to the first embodiment.

Another operation example of the control device 100 is illustrated in FIG. 6.

When a target clutch transmission load changes to the increasing side at time t1, the mode determination unit 112 determines that the mode is the engagement mode, and the feedback control unit 121 starts the feedback control of the actuator 2. Therefore, after time t1, the duty calculated based on the gain is output from the duty output unit 124 as the output duty. As a result, the actual load, which is the actual transmission load of the clutch 70, changes so as to approach the target clutch transmission load.

Since the target clutch transmission load does not change after time t1, the mode determination unit 112 determines that the mode is the steady mode. As a result, S100 of the series of pieces of processing described above is started.

At time t2, the rotation angle deviation converges within the threshold value A1, and at time t3 after a predetermined time T1 (s) has elapsed from time t2, the control shifts to the control stop mode. The feedback control adjustment unit 126 stores the integral calculation value X1 immediately before shifting to the control stop mode, and stops the power supply to the actuator 2, that is, cuts the power supply. As a result, the feedback control of the actuator 2 by the feedback control unit 121 is stopped.

When a disturbance is applied at time t4, and the deviation between the actual control amount (actual load) and target value (target clutch transmission load) of the actuator 2 exceeds the threshold value A1 at time t5, the feedback control unit 121 restarts the feedback control of the actuator 2. Here, the feedback control unit 121 restarts the feedback control of the actuator 2 using the integral calculation value X1 immediately before the feedback control is stopped, that is, the integral calculation value X1 stored at time t3 as an initial value. Therefore, after time t5, the duty calculated based on the gain is output from the duty output unit 124 as the output duty. As a result, the actual load, which is the actual transmission load of the clutch 70, changes so as to follow the target clutch transmission load. Note that the duty output from the duty output unit 124 as the output duty is calculated based on the integral calculation value X1 at time t3 and the proportional calculation value Ya at time t5.

At time t6, the rotation angle deviation converges within the threshold value A1, and at time t7 after a predetermined time T1 (s) has elapsed from time t6, the control shifts to the control stop mode. The feedback control adjustment unit 126 stores the integral calculation value X2 immediately before shifting to the control stop mode, and stops the power supply to the actuator 2. As a result, the feedback control of the actuator 2 by the feedback control unit 121 is stopped.

When the target clutch transmission load changes to the decreasing side at time t8, the mode determination unit 112 determines that the steady mode has shifted to the release mode, and the feedback control unit 121 restarts the feedback control of the actuator 2. Here, the feedback control unit 121 restarts the feedback control of the actuator 2 using the integral calculation value X2 immediately before the feedback control is stopped, that is, the integral calculation value X2 stored at time t7 as an initial value. Therefore, after time t8, the duty calculated based on the gain is output from the duty output unit 124 as the output duty. As a result, the actual load, which is the actual transmission load of the clutch 70, changes so as to approach the target clutch transmission load. Note that the duty output from the duty output unit 124 as the output duty is calculated based on the integral calculation value X2 at time t7 and the proportional calculation value Yb at time t8.

Since the target clutch transmission load does not change after time t8, the mode determination unit 112 determines that the mode is the steady mode. As a result, S100 of the series of pieces of processing described above is started.

At time t9, the rotation angle deviation converges within the threshold value A1, and at time t10 after a predetermined time T1 (s) has elapsed from time t9, the control shifts to the control stop mode. The feedback control adjustment unit 126 stores the integral calculation value X3 immediately before shifting to the control stop mode, and stops the power supply to the actuator 2. As a result, the feedback control of the actuator 2 by the feedback control unit 121 is stopped. Note that time t4 indicates the timing when the disturbance is applied, and the target is not changed at this time. Also, times t1 and t8 indicate timings when the target is updated. Further, times t2, t6, and t9 are timings at which the rotation angle deviation converges within the threshold value A1 in the steady state. Further, times t3, t7, and t10 are timings at which a state in which the rotation angle deviation is within the threshold value A1 in the steady state continues for T1 (s), that is, timings for shifting to the control stop mode.

In a normal PI(D) control, an integral term, that is, an integral calculation value monotonically increases or decreases due to minute deviation after convergence (times t3 to t4, t7 to t8, and after t10).

The feedback control adjustment unit 126 may change the threshold value A1 based on the target transmission torque or the temperature of the clutch 70.

Further, the feedback control adjustment unit 126 may change the predetermined time T1 based on the change width of the target transmission torque or the temperature of the clutch 70.

Figure 7:
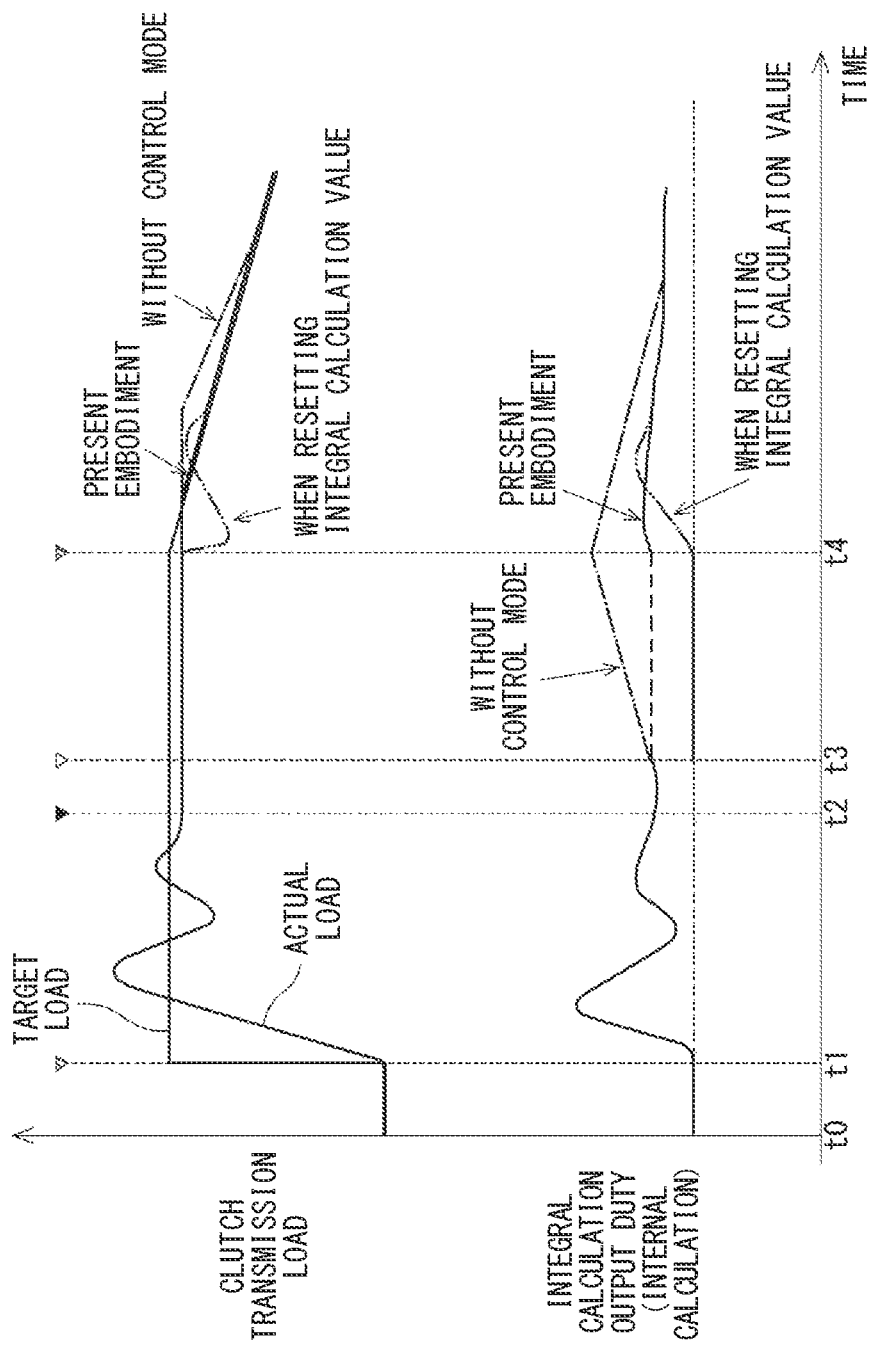
FIG. 7 is a diagram illustrating another operation example of a control device according to the first embodiment.

Another operation example of the control device 100 according to the present embodiment is illustrated in FIG. 7.

In this embodiment (see the solid line in FIG. 7), the feedback control is restarted at time t4 using an integral value stored at time t3 immediately before the feedback control was stopped. Therefore, after time t4, the actual load, which is the actual transmission load of the clutch 70, changes so as to quickly approach the target clutch transmission load.

On the other hand, in a case of a system without a control stop mode (see the dashed-dotted line in FIG. 7), after time t3, the integral calculation value accumulates (see the lower part of FIG. 7), after time t4, the movement slows down due to integral saturation (see the upper part of FIG. 7), and the actual load of the clutch 70 approaches the target clutch transmission load more slowly.

In a case of a system that resets the integral calculation value (see the two-dot chain line in FIG. 7), after time t4, start of movement fluctuates (see the upper part of FIG. 7) and the actual load of the clutch 70 converges to the target clutch transmission load more slowly. Times t1 and t4 indicate timings when the target is updated. Further, time t2 is timing at which the rotation angle deviation converges within the threshold value A1 in the steady state. Further, time t3 is timing at which a state in which the rotation angle deviation is within the threshold value A1 in the steady state continues for T1 (s), that is, timings for shifting to the control stop mode.

In this way, the present embodiment is particularly advantageous in terms of the stability of the behavior of the actual load after the feedback control is restarted, especially for a system that does not have a control stop mode and a system that resets the integral calculation value.

As described above, in the present embodiment, the feedback control adjustment unit 126 shifts to a control stop mode that causes the feedback control unit 121 to stop feedback-controlling the actuator 2 when a predetermined stop condition is satisfied in a case where the mode determination unit 112 determines that the operating mode is the steady mode.

The feedback control adjustment unit 126 stores an integral calculation value in feedback-controlling immediately before the feedback control unit 121 stops feedback-controlling the actuator 2 when shifting to the control stop mode, and then restarts the feedback control unit 121 feedback-controlling the actuator 2 by using the integral calculation value stored when a predetermined restart condition is satisfied.

Therefore, it is possible to reduce the difference between the output duty of the torque transmission device 1 immediately before the feedback control is stopped and the output duty immediately after the feedback control is restarted, thereby suppressing variations in the load behavior immediately after the feedback control is restarted. Therefore, the behavior of the torque transmission device 1 immediately after the feedback control is restarted can be stabilized.

In the present embodiment, in the case where the mode determination unit 112 determines that the operating mode is the steady mode, the feedback control adjustment unit 126 starts the time count when the deviation between the actual control value that is the actual control amount of the actuator 2 and the target value becomes within the threshold value.

In addition, in the present embodiment, the feedback control adjustment unit 126 shifts to the control stop mode when determining, by the time count, that a predetermined time has passed.

The above shows specific examples of the predetermined stop conditions.

Further, in the present embodiment, when the mode determination unit 126, in the control stop mode, that is, in a case where the feedback control of the actuator 2 is stopped, determines that the mode determination unit 112 shifts the steady mode to the engagement mode or the release mode, the feedback control adjustment unit 126 restarts the feedback control unit 121 feedback-controlling the actuator 2.

The above shows a specific example of the predetermined restart condition.

In the present embodiment, the feedback control adjustment unit 126 restarts the feedback control unit 121 feedback-controlling the actuator 2 when a deviation between an actual control value that is an actual control amount of the actuator 2 and a target value exceeds a threshold value in the control stop mode, that is in a case where the feedback control of the actuator 2 is stopped, and then shifts to the control stop mode when a state where the deviation is within the threshold value continues for a predetermined time. Therefore, even when the control stop mode is canceled due to a disturbance or the like, it is possible to shift to the control stop mode again when a predetermined restart condition is satisfied. As a result, the power saving state can be continued.

In the present embodiment, the duty output is updated at the timing of the cycle of the feedback control. That is, in the present embodiment, the duty output unit 124 outputs the output duty in the same cycle as the calculation cycle of the feedback control unit 121. Therefore, the processing timing for shifting to the control stop mode can be shortened, and the responsiveness can be improved.

Further, in this embodiment, the feedback control adjustment unit 126 can change the threshold value based on the target transmission torque or the temperature of the clutch 70.

Further, in the present embodiment, the feedback control adjustment unit 126 can change the predetermined time based on the change width of the target transmission torque or the temperature of the clutch 70.

Therefore, it is possible to achieve the optimum transmission performance such as the responsiveness and stability according to the load or the temperature.

Further, in the present embodiment, the energization control unit 125 can reduce the amount of the power supply to the actuator 2 to maintain the predetermined amount of the power supply without stopping the power supply to the actuator 2. Therefore, the state of the clutch 70 can be reliably maintained in the control stop mode.

In the present embodiment, the actuator 2 includes the electric motor 20 that outputs a torque, and the pressing unit 81 that can move in the axial direction by the torque of the electric motor 20 and press the clutch 70 to switch the state of the clutch 70 to the transmission state or the non-transmission state.

The feedback control unit 121 feedback-controls the actuator 2 based on the target transmission torque and the rotation angle of the electric motor 20. Therefore, it is possible to cope with various controls regardless of a control target.

In the present embodiment, the torque transmission portion is the clutch 70 that is switched to the engaged state or the disengaged state by a pressing force output from the actuator 2.

In the present embodiment, the clutch 70 is of a type that connects and disconnects the input shaft 61 and the output shaft 62, of which one and the other rotate with respect to the fixing flange 3 or the like serving as "another member", and that transmits power. Here, the clutch 70 is of a friction type that can be engaged by friction of the friction plates (the inner friction plates 71 and the outer friction plates 72).

In the present embodiment, the clutch 70 is a wet clutch that can be lubricated by lubricant such as ATF.

In the present embodiment, the clutch 70 is a multi-disc clutch including multiple friction plates (the inner friction plates 71 and the outer friction plates 72).

(Second Embodiment)

A control device according to a second embodiment will be described with reference to FIG. 8. The second embodiment is different from the first embodiment in a method for controlling the actuator 2 by the control device 100.

In the present embodiment, the duty switching timing when the operating mode is changed is a timing faster than the cycle of the feedback control.

Figure 8:
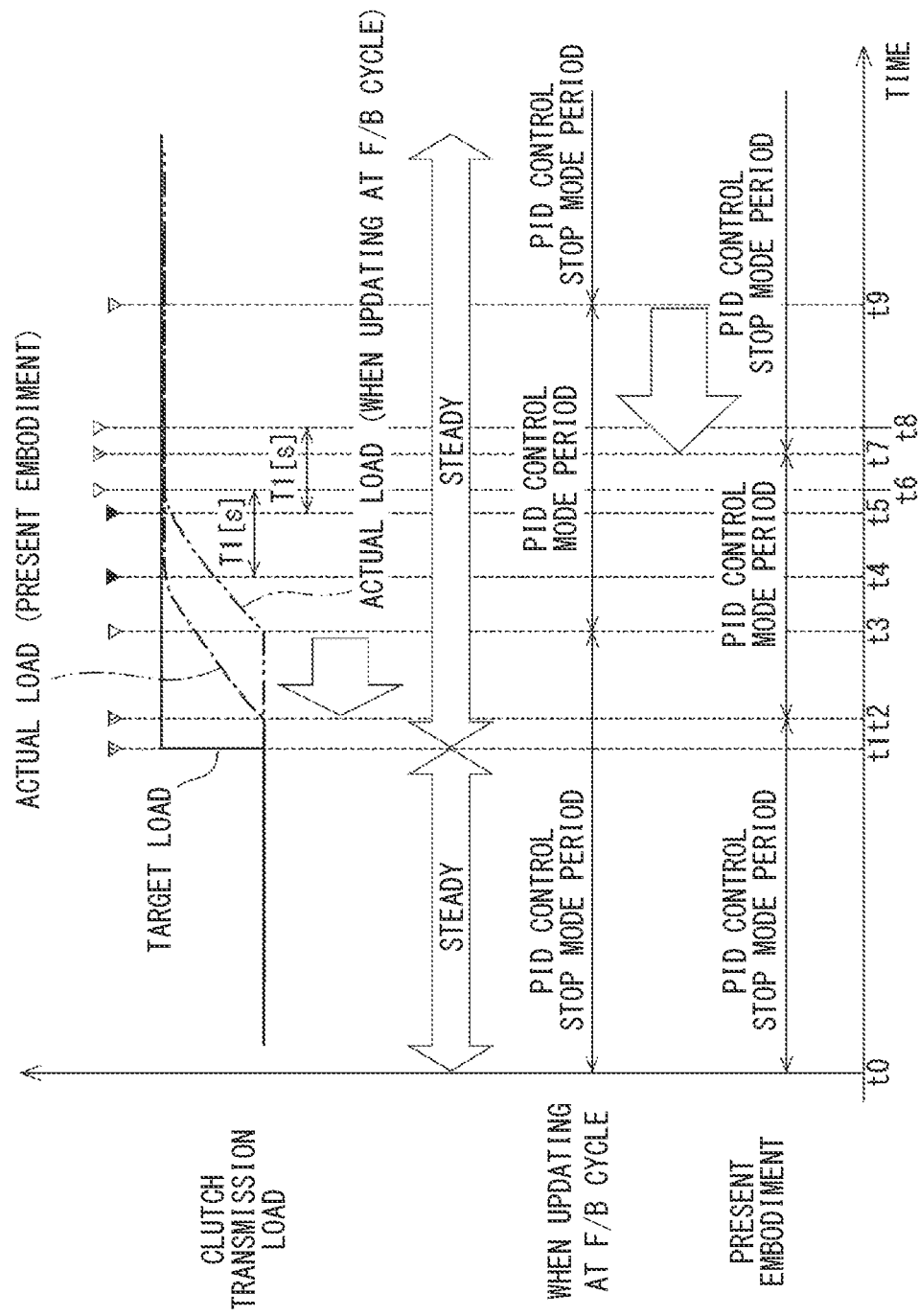
FIG. 8 is a diagram illustrating an operation example of a control device according to a second embodiment.

An operation example of the control device 100 is illustrated in FIG. 8.

When a target clutch transmission load changes to the increasing side at time t1, the mode determination unit 112 determines that the mode is the engagement mode, and the feedback control unit 121 starts the normal PID control of the actuator 2, that is, the feedback control. Therefore, after time t1, the duty calculated based on the gain is output from the duty output unit 124 as the output duty. As a result, in the present embodiment, the actual load, which is the actual transmission load of the clutch 70, changes so as to approach the target clutch transmission load (see the one-dot chain line in FIG. 8).

Since the target clutch transmission load does not change after time t1, the mode determination unit 112 determines that the mode is the steady mode. As a result, S100 of the series of pieces of processing described above is started.

At time t4, the rotation angle deviation converges within the threshold value A1, and at time t7, which is after time t6, after a predetermined time T1 (s) has elapsed from time t4, the control shifts to the control stop mode. The feedback control adjustment unit 126 stores the integral calculation value X immediately before shifting to the control stop mode, and stops the power supply to the actuator 2, that is, cuts the power supply. As a result, the feedback control of the actuator 2 by the feedback control unit 121 is stopped.

Times t2 and t7 are times corresponding to times shorter than the calculation cycle of the feedback control unit 121. Times t3 and t9 are times corresponding to the calculation cycle of the feedback control unit 121.

Next, an operation example in which the duty switching timing at the time of operation mode change is the same timing as the cycle of feedback control will be described.

When a target clutch transmission load changes to the increasing side at time t3, the mode determination unit 112 determines that the mode is the engagement mode, and the feedback control unit 121 starts the normal PID control of the actuator 2, that is, the feedback control. Therefore, after time t3, the duty calculated based on the gain is output from the duty output unit 124 as the output duty. As a result, in the present embodiment, the actual load, which is the actual transmission load of the clutch 70, changes so as to approach the target clutch transmission load (see the two-dot chain line in FIG. 8).

At time t5, the rotation angle deviation converges within the threshold value A1, and at time t9, which is after time t8, after a predetermined time T1 (s) has elapsed from time t5, the control shifts to the control stop mode. The feedback control adjustment unit 126 stores the integral calculation value X immediately before shifting to the control stop mode, and stops the power supply to the actuator 2, that is, cuts the power supply. As a result, the feedback control of the actuator 2 by the feedback control unit 121 is stopped. Time t1 indicates timing when the target is updated. Further, times t4 and t5 are timings at which the rotation angle deviation converges within the threshold value A1 in the steady state. Further, times t6 and t8 indicate timings at which the state in which the rotation angle deviation is within the threshold value A1 in the steady state continued for T1 (s).

As described above, in the present embodiment, the actual load of the clutch 70 can be brought closer to the target value more quickly than when the switching timing of the duty at the time of mode change is the same timing as the cycle of the feedback control, and transition timing to the control stop mode can be hastened.

As described above, in the present embodiment, the duty switching timing when the operating mode is changed is a timing faster than the cycle of the feedback control. That is, in the present embodiment, the duty output unit 124 outputs the output duty in a cycle shorter than the calculation cycle of the feedback control unit 121 for a predetermined period after the mode is determined by the mode determination unit 112. Therefore, it is possible to shorten a dead time when updating the target, that is, when updating the operating mode, and to improve responsiveness. The "cycle shorter than the calculation cycle of the feedback control unit 121" corresponds to, for example, an interrupt processing cycle or an AD detection cycle.

(Third Embodiment)

Figure 9:
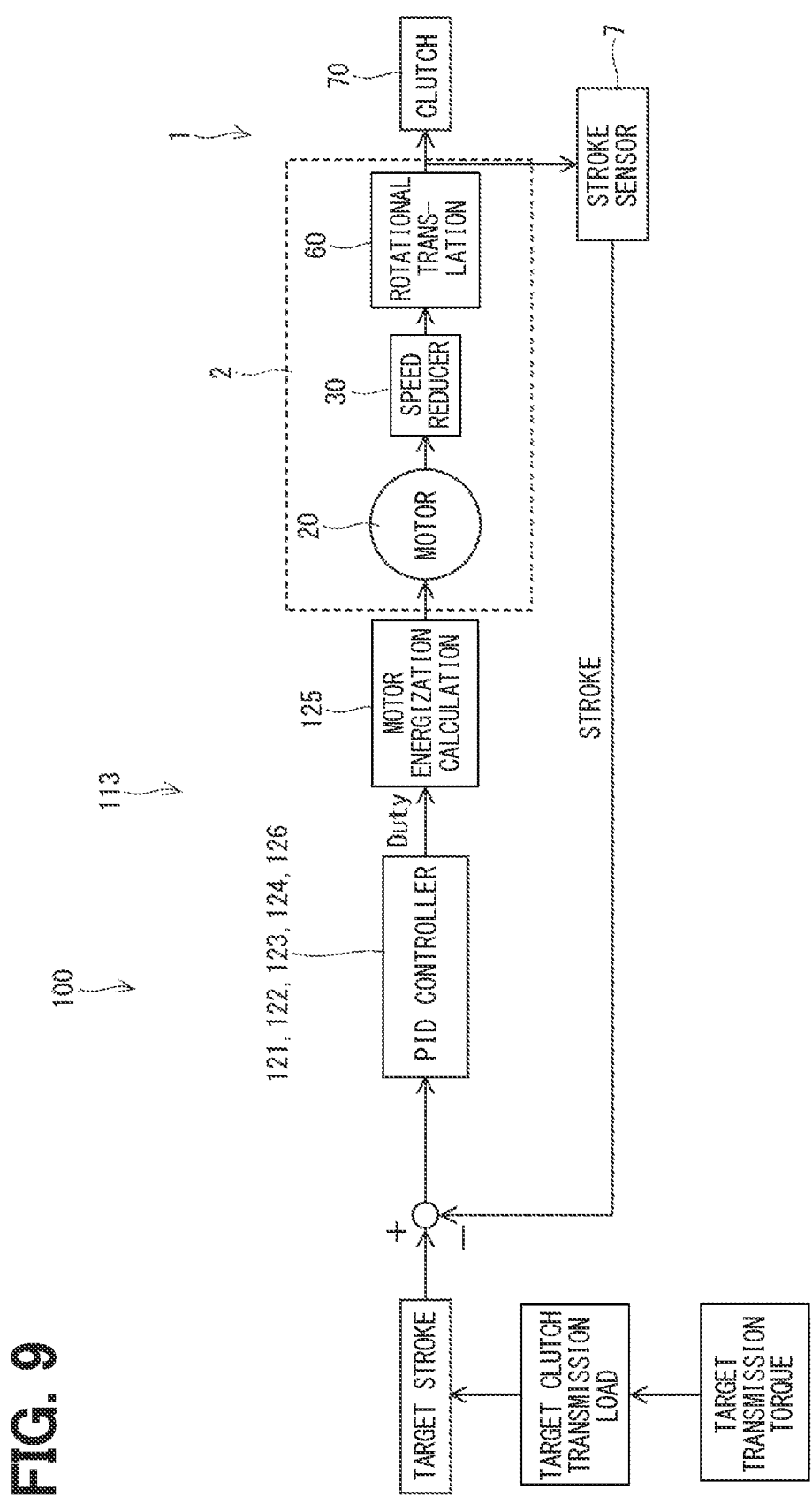
FIG. 9 is a block diagram illustrating a torque transmission device and a control device according to a third embodiment.

A control device according to a third embodiment will be described with reference to FIG. 9. The third embodiment is different from the first embodiment in a configuration of the control device 100, a method for controlling the actuator 2 by the control device 100, and the like.

In the present embodiment, the control device 100 includes a stroke sensor 7. The stroke sensor 7 is provided, for example, in the vicinity of the pressing unit 81. The stroke sensor 7 detects a relative position of the pressing unit 81 with respect to the housing 10 in an axial direction, and outputs a signal corresponding to the relative position to the control device 100. Accordingly, the control device 100 can detect the relative position, a movement amount, and the like of the pressing unit 81 with respect to the housing 10 in the axial direction based on the signal from the stroke sensor 7.

In the present embodiment, a target clutch transmission load, which is a load to be transmitted by the clutch 70, is calculated based on a target transmission torque. A target stroke, which is a target movement amount of the pressing unit 81 in the axial direction, is calculated based on the target clutch transmission load, and a stroke deviation, which is a deviation between the target stroke and the movement amount of the pressing unit 81 in the axial direction detected by the stroke sensor 7, that is, the stroke, is input to the feedback control unit 121.

As described above, in the present embodiment, the feedback control unit 121 feedback-controls the actuator 2 based on the target transmission torque and the movement amount of the pressing unit 81 in the axial direction. Therefore, it is possible to cope with various controls regardless of a control target.

(Fourth Embodiment)

Figure 10:
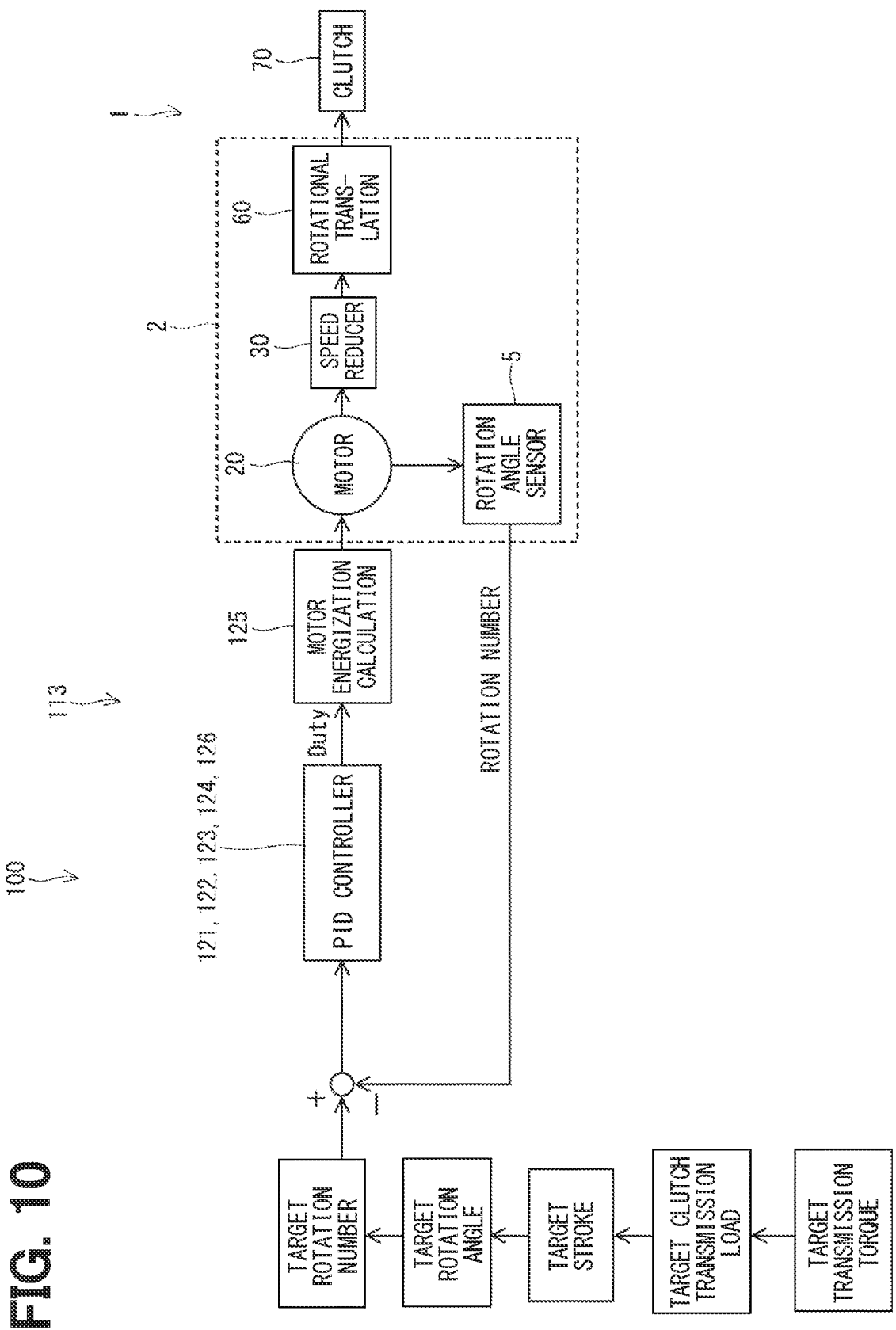
FIG. 10 is a block diagram illustrating a torque transmission device and a control device according to a fourth embodiment.

A control device according to a fourth embodiment will be described with reference to FIG. 10. The fourth embodiment is different from the first embodiment in a method for controlling the actuator 2 by the control device 100, and the like.

In the present embodiment, a target clutch transmission load, which is a load to be transmitted by the clutch 70, is calculated based on a target transmission torque. A target stroke, which is a target movement amount of the pressing unit 81 in the axial direction, is calculated based on the target clutch transmission load. A target rotation angle of the electric motor 20 is calculated based on the target stroke. A target rotation speed is calculated based on the target rotation angle, and a rotation speed deviation, which is a deviation between the target rotation speed and a rotation speed of the electric motor 20 detected by the rotation angle sensor 5, is input to the feedback control unit 121.

As described above, in the present embodiment, the feedback control unit 121 feedback-controls the actuator 2 based on the target transmission torque and the rotation speed of the electric motor 20. Therefore, it is possible to cope with various controls regardless of a control target.

(Fifth Embodiment)

Figure 11:
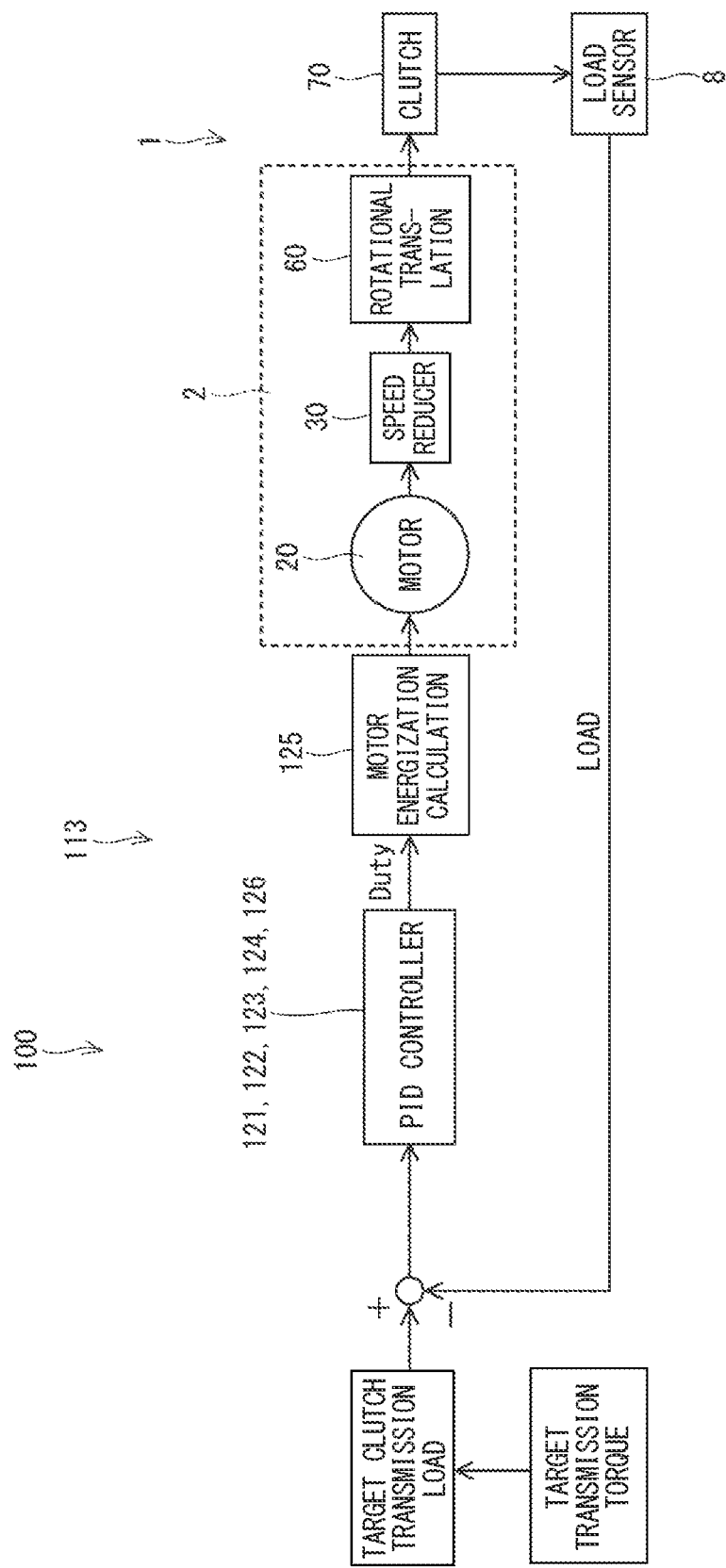
FIG. 11 is a block diagram illustrating a torque transmission device and a control device according to a fifth embodiment.

A control device according to a fifth embodiment will be described with reference to FIG. 11. The fifth embodiment is different from the first embodiment in a configuration of the control device 100, a method for controlling the actuator 2 by the control device 100, and the like.

In the present embodiment, the control device 100 includes a load sensor 8. The load sensor 8 is provided, for example, between the plate portion 622 and the friction plate 624 of the output shaft 62. The load sensor 8 detects an axial load acting on the clutch 70 from the pressing unit 81, and outputs a signal corresponding to the load to the control device 100. Accordingly, the control device 100 can detect the load acting on the clutch 70 from the pressing unit 81 based on the signal from the load sensor 8.

In the present embodiment, a target clutch transmission load, which is a load to be transmitted by the clutch 70, is calculated based on a target transmission torque, and a load deviation, which is a deviation between the target clutch transmission load and the load acting on the clutch 70 from the pressing unit 81 detected by the load sensor 8, is input to the feedback control unit 121.

As described above, in the present embodiment, the feedback control unit 121 feedback-controls the actuator 2 based on the target transmission torque and the load acting on the clutch 70 from the pressing unit 81. Therefore, it is possible to cope with various controls regardless of a control target.

(Sixth Embodiment)

Figure 12:
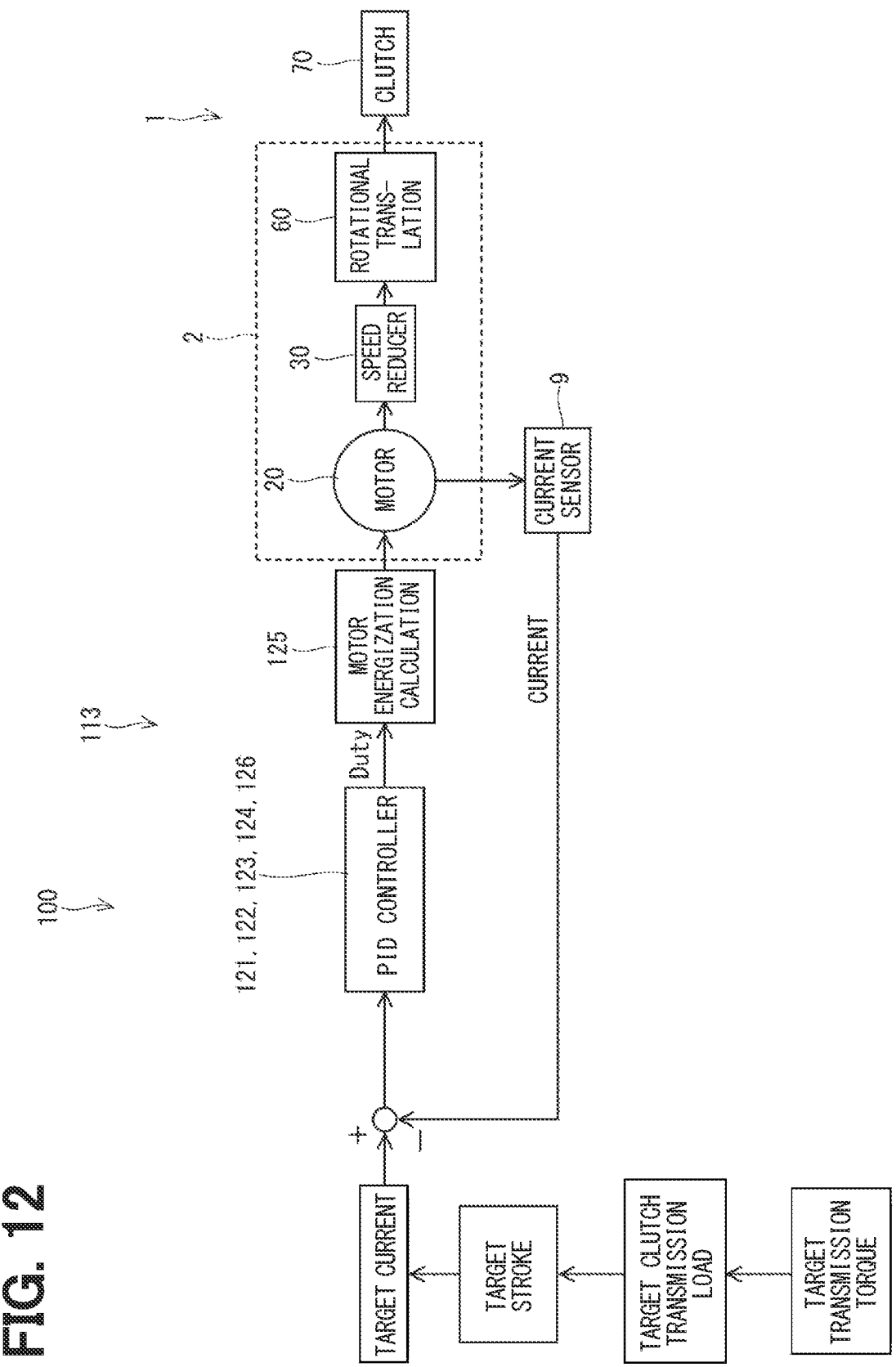
FIG. 12 is a block diagram illustrating a torque transmission device and a control device according to a sixth embodiment.

A control device according to a sixth embodiment will be described with reference to FIGS. 12 and 13. The sixth embodiment is different from the first embodiment in a configuration of the control device 100, a method for controlling the actuator 2 by the control device 100, and the like.

In the present embodiment, the control device 100 includes a current sensor 9. The current sensor 9 detects a current flowing through the electric motor 20, and outputs a signal corresponding to the current to the control device 100. Accordingly, the control device 100 can detect the current flowing through the electric motor 20 based on the signal from the current sensor 9.

In the present embodiment, a target clutch transmission load, which is a load to be transmitted by the clutch 70, is calculated based on a target transmission torque. A target stroke, which is a target movement amount of the pressing unit 81 in the axial direction, is calculated based on the target clutch transmission load. A target current, which is a current to be supplied to the electric motor 20, is calculated based on the target stroke, and a current deviation, which is a deviation between the target current and the current flowing through the electric motor 20 detected by the current sensor 9, is input to the feedback control unit 121.

Figure 13:
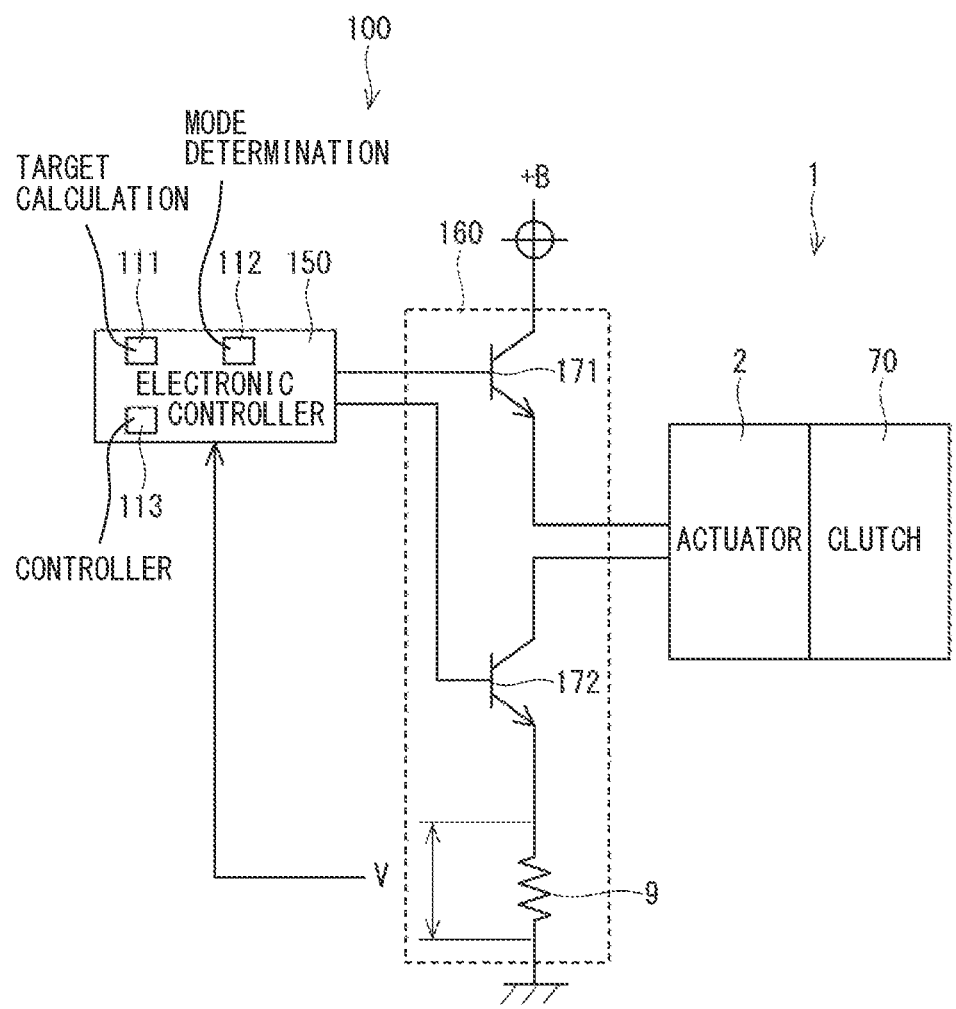
FIG. 13 is a block diagram illustrating the torque transmission device and the control device according to the sixth embodiment.

As illustrated in FIG. 13, the control device 100 includes an electronic controller 150 and a driver 160. The electronic controller 150 includes the target calculation unit 111, the mode determination unit 112, and the control unit 113. As described above, the control unit 113 includes the feedback control unit 121, the gain setting unit 122, the duty calculation unit 123, the duty output unit 124, the energization control unit 125, and a feedback control adjustment unit 126.

In the present embodiment, the feedback control unit 121 is a circuit implemented by software, that is, a soft feedback circuit, and feedback-controls the actuator 2 based on the target transmission torque and the current flowing through the electric motor 20.

The driver 160 includes switching elements 171 and 172 and the current sensor 9. The switching element 171 is connected to the electronic controller 150, the actuator 2, and a positive electrode of a battery of a vehicle. The switching element 172 is connected to the electronic controller 150, the actuator 2, and the current sensor 9. The current sensor 9 is connected to the switching element 172 and a ground of the vehicle.

The energization control unit 125 can control energization of the electric motor 20 of the actuator 2 by controlling operation of the switching elements 171 and 172.

When a current flows through the electric motor 20, a potential difference is generated between one end and the other end of the current sensor 9. Accordingly, the feedback control unit 121 of the control unit 113 can detect the current flowing through the electric motor 20.

In the present embodiment, the target transmission torque is calculated by the target calculation unit 111 of the electronic controller 150, and the output duty is calculated by the duty calculation unit 123 of the control unit 113 of the electronic controller 150 and output by the duty output unit 124.

The feedback control adjustment unit 126 shifts to a control stop mode that causes the feedback control unit 121 to stop feedback-controlling the actuator 2 when a predetermined stop condition is satisfied in a case where the mode determination unit 112 determines that the operating mode is the steady mode.

As described above, in the present embodiment, the feedback control unit 121 feedback-controls the actuator 2 based on the target transmission torque and the current flowing through the electric motor 20. Therefore, it is possible to cope with various controls regardless of a control target.

(Seventh Embodiment)

Figure 14:
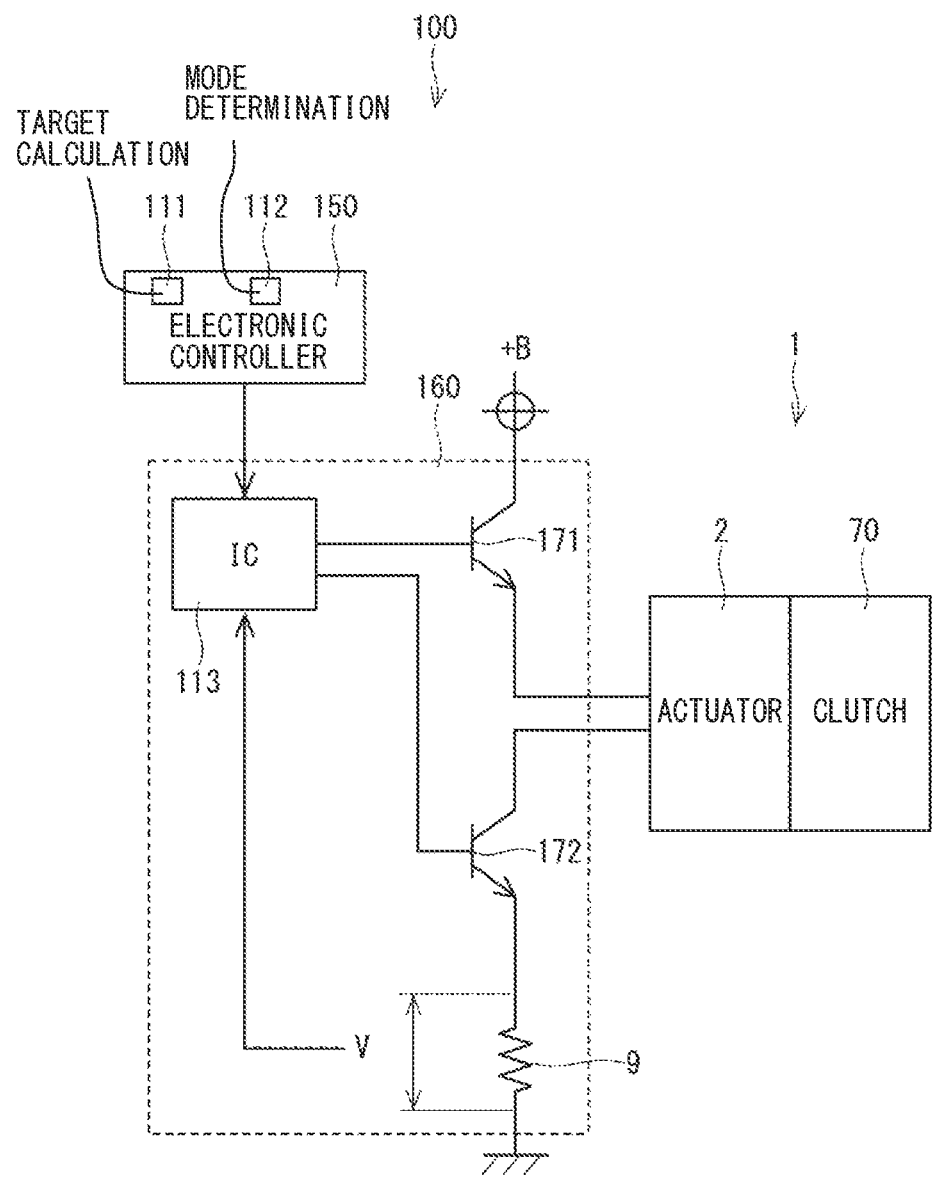
FIG. 14 is a schematic diagram illustrating a torque transmission device and a control device according to a seventh embodiment.

A control device according to a seventh embodiment will be described with reference to FIG. 14. The seventh embodiment is different from the sixth embodiment in a configuration of the control device 100 and the like.

In the present embodiment, unlike the sixth embodiment, the electronic controller 150 does not include the control unit 113. The driver 160 further includes the control unit 113. That is, the control unit 113 is provided in the driver 160 integrally with the switching elements 171 and 172 and the current sensor 9. Here, the control unit 113 is, for example, a circuit implemented by hardware such as an IC. The control unit 113 includes a feedback control unit 121, a gain setting unit 122, a duty calculation unit 123, a duty output unit 124, an energization control unit 125, and a feedback control adjustment unit 126.

In the present embodiment, the feedback control unit 121 is a circuit implemented by hardware, that is, a hard feedback circuit, and feedback-controls the actuator 2 based on a target transmission torque and a current flowing through the electric motor 20.

The control unit 113 is connected to the electronic controller 150, the switching elements 171 and 172, and the current sensor 9.

The energization control unit 125 of the control unit 113 can control energization of the electric motor 20 of the actuator 2 by controlling operation of the switching elements 171 and 172.

The feedback control unit 121 of the control unit 113 can detect the current flowing through the electric motor 20.

In the present embodiment, the target transmission torque is calculated by the target calculation unit 111 of the electronic controller 150, and an output duty is calculated by the duty calculation unit 123 of the control unit 113 and output by the duty output unit 124.

The feedback control adjustment unit 126 shifts to a control stop mode that causes the feedback control unit 121 to stop feedback-controlling the actuator 2 when a predetermined stop condition is satisfied in a case where the mode determination unit 112 determines that the operating mode is the steady mode.

As described above, in the present embodiment, the feedback control unit 121 is a circuit implemented by hardware, and feedback-controls the actuator 2 based on the target transmission torque and the current flowing through the electric motor 20. Therefore, an inexpensive driver IC can be selected when implementing the control unit 113, and the cost can be reduced.

(Eighth Embodiment)

A control device according to an eighth embodiment will be described with reference to FIG. 15. The eighth embodiment is different from the first embodiment in a method for controlling the actuator 2 by the control device 100 and the like.

Figure 15:
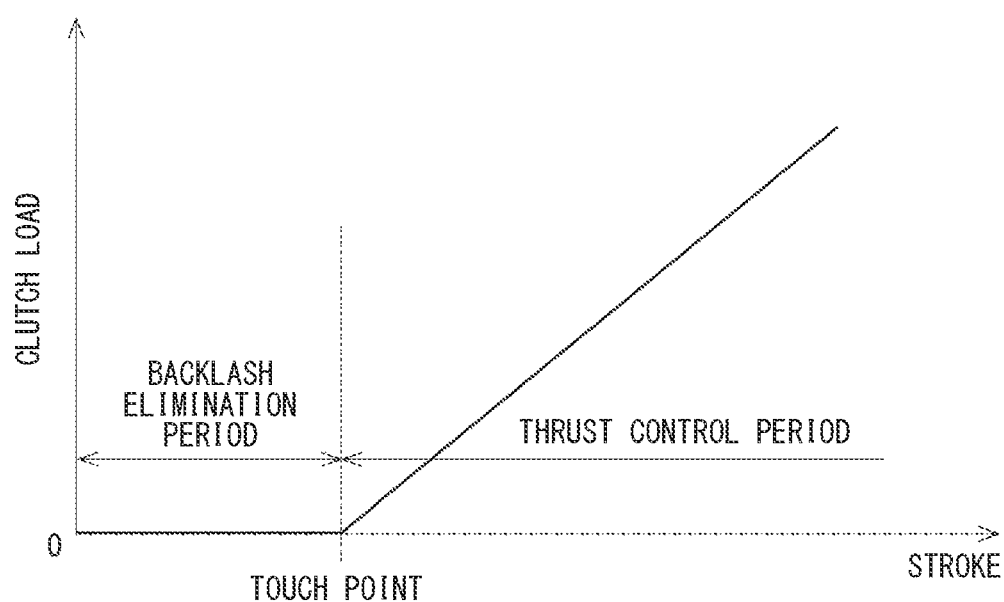
FIG. 15 is a diagram illustrating operation of a torque transmission device and a control device according to an eighth embodiment, and illustrating a relation between a clutch load and a stroke.

FIG. 15 illustrates a relation between a relative position of the pressing unit 81 with respect to the housing 10 in an axial direction, that is, a stroke of the pressing unit 81, and an actual transmission load of the clutch 70, that is, a clutch load.

In this embodiment, the feedback control adjustment unit 126 shifts to the control stop mode when the mode determination unit 112 determines that the mode is the steady mode only in the case where the reaction force from the clutch 70 to the actuator 2 is greater than 0.

Specifically, as shown in FIG. 15, in a looseness elimination period when the pressing unit 81 approaches the clutch 70 and the clearance between the pressing unit 81 and the clutch 70 becomes smaller, that is, when the reaction force from the clutch 70 to the actuator 2 becomes 0 or less, the feedback control adjustment unit 126 does not shift to the control stop mode even if the mode determination unit 112 determines that the mode is the steady mode.

After the touching point at which the pressing unit 81 contacts the clutch 70, in a thrust control period when the pressing unit 81 presses the clutch 70 and the clutch load becomes greater than 0, that is, when the reaction force from the clutch 70 to the actuator 2 becomes greater than 0, the feedback control adjustment unit 126 shifts to the control stop mode if the mode determination unit 112 determines that the mode is the steady mode.

As described above, in this embodiment, the feedback control adjustment unit 126 can shift to the control stop mode when the mode determination unit 112 determines that the mode is the steady mode only in the case where the reaction force from the clutch 70 to the actuator 2 is greater than 0. Since there is no effect of the load of the clutch 70 during the looseness elimination period, the processing load can be suppressed without performing the processing for shifting to the control stop mode. In addition, during the thrust control period, when a system that does not have a control stop mode or a system that resets an integral calculation value since the reaction force from the clutch 70 to the actuator 2 is large is used, there is a possibility that the load behavior will vary immediately after the feedback control is restarted. However, in this embodiment, it is possible to suppress variations in load behavior immediately after the feedback control is restarted after the control stop mode, which is preferable.

(Other Embodiments)

In the other embodiments, a torque may be received from a second transmission portion and output from a first transmission portion via a clutch. For example, when one of the first transmission portion and the second transmission portion is non-rotatably fixed, the rotation of the other of the first transmission portion and the second transmission portion can be stopped by bringing the clutch into an engaged state. In this case, the clutch is of a type that connects and disconnects the first transmission portion and the second transmission portion, of which one is fixed and the other relatively rotates with respect to another member, and that weakens or stops the transmitted power. Here, the clutch can function as a brake.

In the other embodiments, the clutch may be a dry clutch.

In the other embodiments, the clutch may be a single-disc clutch.

In the other embodiments, a torque transmission portion is not limited to the clutch and may have any configuration as long as the torque transmission portion is switched to a transmission state or a non-transmission state by operation of an actuator.

As described above, the present disclosure is not limited to the above embodiments and can be practiced in various forms without departing from the gist of the present disclosure.

The control unit and the technique according to the present disclosure may be achieved by a dedicated computer provided by constituting a processor and a memory programmed to execute one or more functions embodied by a computer program. Alternatively, the control circuit and the method described in the present disclosure may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer program may be stored, as instructions to be executed by a computer, in a tangible non-transitory computer-readable medium.

The present disclosure has been described on the basis of embodiments. However, the present disclosure is not limited to such embodiments and structures. The present disclosure also encompasses various modifications and variations within the scope of equivalents. Furthermore, various combination and formation, and other combination and formation including one, more than one or less than one element may be made in the present disclosure.

What is claimed is:

1. A control device that controls a torque transmission device, the torque transmission device including an actuator that operates by being energized and a torque transmission portion that is switched to a transmission state or a non-transmission state by the actuator operating, and configured to transmit a torque between a first transmission portion and a second transmission portion when the torque transmission portion is in the transmission state, the control device comprising:
 a target calculation unit configured to calculate a target transmission torque that is a torque to be transmitted between the first transmission portion and the second transmission portion;
 a mode determination unit configured to determine that an operating mode is an engagement mode when the target transmission torque increases over time, determine that the operating mode is a release mode when the target transmission torque decreases over time, and determine that the operating mode is a steady mode when the target transmission torque does not change over time; and
 a control unit configured to control the actuator based on the operating mode determined by the mode determination unit, wherein
 the control unit includes
  a feedback control unit configured to perform feedback-control of the actuator based on the target transmission torque,
  a gain setting unit configured to set a gain used for the feedback-control by the feedback control unit,
  a duty calculation unit configured to calculate a duty based on the gain,
  a duty output unit configured to output the duty calculated by the duty calculation unit as an output duty,
  an energization control unit configured to control energization of the actuator based on the output duty output from the duty output unit, and
  a feedback control adjustment unit configured to shift to a control stop mode that causes the feedback control unit to stop the feedback-control of the actuator when a predetermined stop condition is satisfied in a case where the mode determination unit determines that the operating mode is the steady mode, and
 the feedback control adjustment unit stores an integral calculation value in the feedback-control immediately before the feedback control unit stops the feedback-control of the actuator when shifting to the control stop mode, and then restarts the feedback control unit performing the feedback-control of the actuator by using the integral calculation value stored when a predetermined restart condition is satisfied.

2. The control device according to claim 1, wherein in a case where the mode determination unit determines that the operating mode is the steady mode, the feedback control adjustment unit starts a time count when a deviation between an actual control value that is an actual control amount of the actuator and a target value becomes within a threshold value.

3. The control device according to claim 2, wherein the feedback control adjustment unit shifts to the control stop mode when determining, based on the time count, that a predetermined time has passed.

4. The control device according to claim 3, wherein the feedback control adjustment unit is configured to change the threshold value based on the target transmission torque or a temperature of the torque transmission portion.

5. The control device according to claim 4, wherein the feedback control adjustment unit is configured to change the predetermined time based on a change width of the target transmission torque or the temperature of the torque transmission portion.

6. The control device according to claim 1, wherein when the mode determination unit, in the control stop mode, determines that the steady mode shifts to the engagement mode or the release mode, the feedback control adjustment unit restarts the feedback control unit performing the feedback-control of the actuator.

7. The control device according to any claim 1, wherein the feedback control adjustment unit restarts the feedback control unit performing the feedback-control of the actuator when a deviation between an actual control value that is an actual control amount of the actuator and a target value exceeds a threshold value in the control stop mode, and then shifts to the control stop mode when a state where the deviation is within the threshold value continues for a predetermined time.

8. The control device according to claim 1, wherein the duty output unit outputs the output duty in a same cycle as a calculation cycle of the feedback control unit.

9. The control device according to claim 8, wherein the duty output unit outputs the output duty in a cycle shorter than a calculation cycle of the feedback control unit.

10. The control device according to claim 1, wherein the energization control unit, in the control stop mode, without stopping power supply to the actuator, reduces an amount of power supply to the actuator to maintain a predetermined amount of power supply.

11. The control device according to claim 1, wherein the actuator includes
 an electric motor configured to output a torque, and
 a pressing unit configured to move in an axial direction by the torque of the electric motor and press the torque transmission portion to switch a state of the torque transmission portion to the transmission state or the non-transmission state, and
the feedback control unit performs the feedback-control of the actuator based on the target transmission torque, and a rotation angle of the electric motor, a movement amount of the pressing unit, a rotation speed of the electric motor, a load to be applied from the pressing unit to the torque transmission portion, or a current flowing through the electric motor.

12. The control device according to claim 11, wherein the feedback control unit is a circuit implemented by hardware, and is configured to perform the feedback-control of the actuator based on the target transmission torque and a current flowing through the electric motor.

13. The control device according to claim 1, wherein the torque transmission portion is a clutch that is switched to the engaged state or the disengaged state by a pressing force output from the actuator.

14. The control device according to claim 13, wherein the clutch is of a type configured to connect and disconnect the first transmission portion and the second transmission portion, of which one and the other rotate with respect to another member, and to transmit power, or is of a type configured to connect and disconnect the first transmission portion and the second transmission portion, of which one is fixed and the other relatively rotates with respect to the other member, and to weaken or stop the transmitted power.

15. The control device according to claim 13, wherein the clutch is a dry clutch or a wet clutch.

16. The control device according to any one of claim 13, wherein
the clutch is a single-disc clutch or a multi-disc clutch.

17. A control device that controls a torque transmission device, the torque transmission device including an actuator that operates by being energized and a torque transmission portion that is switched to a transmission state or a non-transmission state by the actuator operating, and configured to transmit a torque between a first transmission portion and a second transmission portion when the torque transmission portion is in the transmission state, the control device comprising a processor configured to:

calculate a target transmission torque that is a torque to be transmitted between the first transmission portion and the second transmission portion;

determine that an operating mode is an engagement mode when the target transmission torque increases over time, determine that the operating mode is a release mode when the target transmission torque decreases over time, and determine that the operating mode is a steady mode when the target transmission torque does not change over time;

control the actuator based on the operating mode determined, perform feedback-control of the actuator based on the target transmission torque, set a gain used for the feedback-control, calculate a duty based on the gain, output the duty calculated as an output duty, control energization of the actuator based on the output duty, and shift to a control stop mode that causes the processor to stop the feedback-control of the actuator when a pre-determined stop condition is satisfied in a case where the processor determines that the operating mode is the steady mode, and store an integral calculation value in the feedback-control immediately before the processor stops the feedback-control of the actuator when shifting to the control stop mode, and then restarts the processor performing the feedback-control of the actuator by using the integral calculation value stored when a predetermined restart condition is satisfied.

* * * * *